US012599942B2

(12) United States Patent
Mengual

(10) Patent No.: US 12,599,942 B2
(45) Date of Patent: Apr. 14, 2026

(54) EXTRACTION DEVICE AND MECHANISMS, AND USE IN RECYCLING BEVERAGE CAPSULES

(71) Applicant: RECYCAP TECHNOLOGIES, S.L., Valencia (ES)

(72) Inventor: Vicente Oller Mengual, Valencia (ES)

(73) Assignee: RECYCAP TECHNOLOGIES, S.L., Valencia (ES)

( * ) Notice: Subject to any disclaimer, the term of this patent is extended or adjusted under 35 U.S.C. 154(b) by 448 days.

(21) Appl. No.: 18/129,763

(22) Filed: Mar. 31, 2023

(65) Prior Publication Data

US 2024/0326106 A1 Oct. 3, 2024

(51) Int. Cl.
*B08B 9/08* (2006.01)
*B08B 9/38* (2006.01)

(52) U.S. Cl.
CPC .......... *B08B 9/0808* (2013.01); *B08B 9/0826* (2013.01); *B08B 9/38* (2013.01); *B08B 2209/08* (2013.01)

(58) Field of Classification Search
CPC ....... B08B 9/08; B08B 9/0804; B08B 9/0808; B08B 9/0821; B08B 9/0826; A47J 31/60; A47J 31/407; A47J 31/44; A47L 15/0068; A47L 15/0065
USPC .............................................................. 15/56
See application file for complete search history.

(56) References Cited

U.S. PATENT DOCUMENTS

| | | | | |
|---|---|---|---|---|
| 2,032,915 | A * | 3/1936 | Cunningham | A47L 15/0068 15/179 |
| 6,079,315 | A * | 6/2000 | Beaulieu | A47J 31/4467 99/302 R |
| 2009/0314166 | A1* | 12/2009 | Galbis | A47J 31/44 99/289 R |
| 2015/0329282 | A1* | 11/2015 | Bartoli | B01F 35/51 426/115 |
| 2018/0290821 | A1 | 10/2018 | Domenighini et al. | |

FOREIGN PATENT DOCUMENTS

| | | | | |
|---|---|---|---|---|
| CN | 218432693 U | 2/2023 | | |
| DE | 10219590 A1 * | 11/2003 | B08B 1/143 | |
| EP | 1236521 A1 | 9/2002 | | |
| FR | 2944420 A1 | 10/2010 | | |
| NL | 1028958 C2 * | 11/2006 | A47L 15/0068 | |
| WO | WO 2018/127676 A1 | 7/2018 | | |
| WO | WO 2021/038118 A1 | 3/2021 | | |

OTHER PUBLICATIONS

Translation of WO2021038118a1 (Year: 2021).*
International Search Report and Written Opinion issued in application No. PCT/IB2023/053371, mailed Jan. 8, 2024.

* cited by examiner

*Primary Examiner* — Tom Rodgers
(74) *Attorney, Agent, or Firm* — KNOBBE, MARTENS, OLSON & BEAR, LLP

(57) ABSTRACT

Extraction devices and mechanisms for removing debris from a beverage capsule are described, in addition to beverage devices including such an extraction device. Methods of cleaning and reusing a beverage capsule are also described.

15 Claims, 21 Drawing Sheets

EXTRACTION DEVICE AND MECHANISMS, AND USE IN RECYCLING BEVERAGE CAPSULES

BACKGROUND

Field

The present disclosure generally relates to extraction devices and mechanisms for removing debris from a beverage capsule, in addition to beverage devices including the same. The present disclosure also generally relates to methods of cleaning a beverage capsule, making it suitable for reuse.

Description of the Related Art

Beverage capsules, for example coffee capsules, provide a means of preparing a single-portion beverage. Such capsules contribute to global waste production, as they include an ingredient which remains within the capsule after its use, such as coffee grounds. Thus, it is desirable to separate the capsule from the content remaining in the used capsule. Based on the above, there exists a need for extraction devices and mechanisms for removing debris from a beverage capsule.

SUMMARY

Some embodiments of the present disclosure relate to an extraction device for cleaning a capsule, comprising: a retainer positioned at a distal end of the extraction device; a plunger positioned at a proximal end of the extraction device; and a screw comprising a shaft and at least one thread in the shape of a helical spiral positioned at the distal portion of the shaft, wherein the helical spiral is defined by the outer edge of the thread, wherein the pitch of the helical spirals ranges from about 5 mm to about 50 mm, wherein the screw is disposed between the plunger and the retainer, wherein the proximal end of the screw extends from the distal end of the plunger, wherein the plunger is configured to press the screw along the vertical axis of the extraction device.

In some embodiments, the helical spiral encompasses a turn of at least about 240°. In some embodiments, the helical spiral encompasses a turn of at least about 720°. In some embodiments, the helical spiral encompasses a turn of at least about 1,440°. In some embodiments, the pitch of the helical spirals ranges from about 5 mm to about 20 mm. In some embodiments, the radius of the spiral is constant. In some embodiments, the radius of the spiral increases from zero to a predetermined length. In some embodiments, the shaft comprises a cavity extending through the length of shaft. In further embodiments, the shaft comprises an outlet positioned at the distal end of the shaft. In further embodiments, the screw substantially contours to the capsule, and the outlet is configured to eject a gaseous or liquid solution. In some embodiments, the length of the shaft ranges from about 30 mm to about 200 mm. In some embodiments, extraction device further comprises an anchor configured to couple to the retainer. In other embodiments, extraction device further comprises a means for locking the retainer in a predetermined orientation.

In some embodiments, the capsule is comprised of a material selected from a metal, a plastic, a rigid biological material, and a wood-based material. In further embodiments, the material is a metal, and the metal is aluminum. In some embodiments, the material is a plastic, and the plastic is selected from a polystyrene and a polypropylene. In other embodiments, the material is a rigid biological material or a wood-based material, the material is at least partially biodegradable, and the rigid biological materials or wood-based material is selected from a mushroom mycelia, cardboard, and wood fiber.

In some embodiments, the helical spirals are configured to have a plurality of gap slots within the helical spirals. In some embodiments, the helical spirals are configured to have a plurality of apertures within the helical spirals for the passage of debris.

Some embodiments relate to an extraction device for cleaning a capsule, comprising: a retainer positioned at a distal end of the extraction device; a plunger positioned at a proximal end of the extraction device; and a rotative screw for cleaning a capsule, comprising a central shaft and at least one fin positioned at the distal end of the shaft, wherein the at least one fin comprises: a first linear section oriented along the horizontal axis of the shaft; a first angled section extending from the first linear section, the first angled section comprising an outwardly-angled portion that angles outwardly from the first linear section; and a first vertical section oriented along the vertical axis of the shaft, the first vertical section extending from the first angled section, such that the screw substantially contours to the capsule, wherein the screw is disposed between the plunger and the retainer, wherein the proximal end of the screw extends from the distal end of the plunger, wherein the plunger is configured to press the screw along the vertical axis of the extraction device. In some embodiments, the device further comprises a handle positioned at the proximal end of the plunger.

In some embodiments, at least one fin is substantially solid from the first linear section to the radius of the shaft. In some embodiments, the first vertical section angles outwardly from the first angled section in a range of about 0° to about 60° relative to the vertical axis. In some embodiments, the first vertical section angles outwardly from the first angled section in a range of about 0° to about 45° relative to the vertical axis. In some embodiments, the length of the shaft ranges from about 30 mm to about 200 mm. In some embodiments, extraction device further comprises an anchor configured to couple to the retainer. In other embodiments, extraction device further comprises a means for locking the retainer in a predetermined orientation.

Some embodiments relate to an extraction device for cleaning a capsule, comprising: a retainer positioned at a distal end of the extraction device; a plunger positioned at a proximal end of the extraction device; and a rotative screw for cleaning a capsule, comprising a central shaft and at least one linear section positioned at the distal end of the shaft, wherein the at least one linear section oriented along the horizontal axis of the shaft, wherein the at least one linear section comprises a plurality of prongs extending distally from the linear section, wherein the distal end of the plurality of prongs are substantially needle shaped, wherein the outer edges of the plurality of prongs are angled inward towards the center of the shaft, such that the screw substantially contours to the capsule, wherein the screw is disposed between the plunger and the retainer, wherein the proximal end of the screw extends from the distal end of the plunger, wherein the plunger is configured to press the screw along the vertical axis of the extraction device. In some embodiments, the device further comprises a handle positioned at the proximal end of the plunger.

In some embodiments, the first vertical section angles outwardly from the first angled section in a range of about 0° to about 60° relative to the vertical axis. In further embodiments, the first vertical section angles outwardly from the first angled section in a range of about 0° to about 45° relative to the vertical axis. In some embodiments, the length of the shaft ranges from about 30 mm to about 200 mm. In some embodiments, extraction device further comprises an anchor configured to couple to the retainer. In other embodiments, extraction device further comprises a means for locking the retainer in a predetermined orientation.

In some embodiments, the plunger is further configured to rotate the screw along the horizontal axis of the extraction device. In some embodiments, the extraction device further comprises a feeder system configured to place a capsule into the retainer.

Some embodiments relate to an extraction device for cleaning a capsule, comprising: a screw comprising a shaft and at least one thread forming a helical spiral positioned at the distal portion of the shaft; a feeder system; and a retainer, wherein the helical spiral is defined by the outer edge of the thread, wherein the pitch of the helical spirals ranges from about 5 mm to about 50 mm, wherein the feeder system is configured to place a capsule into the retainer in a horizontal orientation. In some embodiments, the helical spiral encompasses a turn of at least about 240°. In some embodiments, the helical spiral encompasses a turn of at least about 720°. In some embodiments, the helical spiral encompasses a turn of at least about 1,440°. In some embodiments, the pitch of the helical spirals ranges from about 5 mm to about 20 mm. In some embodiments, the radius of the spiral is constant. In some embodiments, the radius of the spiral increases from zero to a predetermined length. In some embodiments, the shaft comprises a cavity extending through the length of shaft. In further embodiments, the shaft comprises an outlet positioned at the distal end of the shaft. In further embodiments, the screw substantially contours to the capsule, and the outlet is configured to eject a gaseous or liquid solution. In some embodiments, the helical spirals are configured to have a plurality of gap slots within the helical spirals. In some embodiments, the helical spirals are configured to have a plurality of apertures within the helical spirals for the passage of debris.

Some embodiments relate to an extraction device for cleaning a capsule, comprising: a rotative screw for cleaning a capsule, comprising a central shaft and at least one fin positioned at the distal end of the shaft, wherein the at least one fin comprises: a first linear section oriented along the horizontal axis of the shaft; a first angled section extending from the first linear section, the first angled section comprising an outwardly-angled portion that angles outwardly from the first linear section; and a first vertical section oriented along the vertical axis of the shaft, the first vertical section extending from the first angled section, such that the screw substantially contours to the capsule; a feeder system; and a retainer, wherein the feeder system is configured to place a capsule into the retainer in a horizontal orientation. In some embodiments, at least one fin is substantially solid from the first linear section to the radius of the shaft. In some embodiments, the first vertical section angles outwardly from the first angled section in a range of about 0° to about 60° relative to the vertical axis. In some embodiments, the first vertical section angles outwardly from the first angled section in a range of about 0° to about 45° relative to the vertical axis. In some embodiments, the length of the shaft ranges from about 30 mm to about 200 mm. In some embodiments, extraction device further comprises an anchor configured to couple to the retainer. In other embodiments, extraction device further comprises a means for locking the retainer in a predetermined orientation.

Some embodiments relate to an extraction device for cleaning a capsule, comprising: a rotative screw for cleaning a capsule, comprising a central shaft and at least one linear section positioned at the distal end of the shaft, wherein the at least one linear section oriented along the horizontal axis of the shaft, wherein the at least one linear section comprises a plurality of prongs extending distally from the linear section, wherein the distal end of the plurality of prongs are substantially needle shaped, wherein the outer edges of the plurality of prongs are angled inward towards the center of the shaft, such that the screw substantially contours to the capsule; a feeder system; and a retainer, wherein the feeder system is configured to place a capsule into the retainer in a horizontal orientation. In some embodiments, the first vertical section angles outwardly from the first angled section in a range of about 0° to about 60° relative to the vertical axis. In some embodiments, the first vertical section angles outwardly from the first angled section in a range of about 0° to about 45° relative to the vertical axis.

Some embodiments relate to an extraction device for cleaning a capsule, comprising: a screw comprising a shaft and at least one thread forming a helical spiral positioned at the distal portion of the shaft, wherein the helical spiral is defined by the outer edge of the thread, wherein the pitch of the helical spirals ranges from about 5 mm to about 50 mm; a feeder system; a retainer; and a transport system; wherein the transport system is configured to displace the retainer towards the screw; wherein the transport system comprises an axle and a pin, configured to orient the retainer from a vertical orientation to a horizontal orientation. In some embodiments, the axle and the pin are further configured to apply pressure to the capsule. In some embodiments, the helical spiral encompasses a turn of at least about 240°. In some embodiments, the helical spiral encompasses a turn of at least about 720°. In some embodiments, the helical spiral encompasses a turn of at least about 1,440°. In some embodiments, the pitch of the helical spirals ranges from about 5 mm to about 20 mm. In some embodiments, the radius of the spiral is constant. In some embodiments, the radius of the spiral increases from zero to a predetermined length. In some embodiments, the shaft comprises a cavity extending through the length of shaft. In further embodiments, the shaft comprises an outlet positioned at the distal end of the shaft. In further embodiments, the screw substantially contours to the capsule, and the outlet is configured to eject a gaseous or liquid solution. In some embodiments, the helical spirals are configured to have a plurality of gap slots within the helical spirals. In some embodiments, the helical spirals are configured to have a plurality of apertures within the helical spirals for the passage of debris. In some embodiments, the length of the shaft ranges from about 30 mm to about 200 mm.

Some embodiments relate to an extraction device for cleaning a capsule, comprising: a rotative screw for cleaning a capsule, comprising a central shaft and at least one fin positioned at the distal end of the shaft, wherein the at least one fin comprises: a first linear section oriented along the horizontal axis of the shaft; a first angled section extending from the first linear section, the first angled section comprising an outwardly-angled portion that angles outwardly from the first linear section; and a first vertical section oriented along the vertical axis of the shaft, the first vertical section extending from the first angled section, such that the screw substantially contours to the capsule; a feeder system; a retainer; and a transport system; wherein the transport system is configured to displace the retainer towards the screw; wherein the transport system comprises an axle and a pin, configured to orient the retainer from a vertical orientation to a horizontal orientation. In some embodiments, the axle and the pin are further configured to apply pressure to the capsule. In some embodiments, at least one fin is substantially solid from the first linear section to the radius of the shaft. In some embodiments, the first vertical section angles outwardly from the first angled section in a range of about 0° to about 60° relative to the vertical axis. In some embodiments, the first vertical section angles outwardly from the first angled section at an angle in a range of about 0° to about 45° relative to the vertical axis. In some embodiments, the length of the shaft ranges from about 30 mm to about 200 mm.

Some embodiments relate to an extraction device for cleaning a capsule, comprising: a rotative screw for cleaning a capsule, comprising a central shaft and at least one linear section positioned at the distal end of the shaft, wherein the at least one linear section oriented along the horizontal axis of the shaft, wherein the at least one linear section comprises a plurality of prongs extending distally from the linear section, wherein the distal end of the plurality of prongs are substantially needle shaped, wherein the outer edges of the plurality of prongs are angled inward towards the center of the shaft, such that the screw substantially contours to the capsule; a feeder system; a retainer; and a transport system; wherein the transport system is configured to displace the retainer towards the screw; wherein the transport system comprises an axle and a pin, configured to orient the retainer from a vertical orientation to a horizontal orientation. In some embodiments, the axle and the pin are further configured to apply pressure to the capsule. In some embodiments, the first vertical section angles outwardly from the first angled section in a range of about 0° to about 60° relative to the vertical axis. In some embodiments, the first vertical section angles outwardly from the first angled section in a range of about 0° to about 45° relative to the vertical axis. In some embodiments, the length of the shaft ranges from about 30 mm to about 200 mm. In some embodiments, the capsule is comprised of a material selected from a metal, a plastic, a rigid biological material, and a wood-based material. In further embodiments, the material is a metal, and the metal is aluminum. In some embodiments, the material is a plastic, and the plastic is selected from a polystyrene and a polypropylene. In other embodiments, the material is a rigid biological material or a wood-based material, the material is at least partially biodegradable, and the rigid biological materials or wood-based material is selected from a mushroom mycelia, cardboard, and wood fiber.

Some embodiments relate to a beverage preparation device, comprising: a housing; a plurality of tanks; a capsule storage mechanism; and an extraction device as in any one of the extraction devices disclosed herein. In further embodiments, the beverage preparation device is a coffee machine. Some embodiments of the present disclosure relate to a method of reusing a beverage capsule, comprising: brewing an ingredient in the capsule; and recycling the capsule with the extraction device as in any one of the extraction devices disclosed herein.

Some embodiments relate to a method of cleaning a recyclable capsule of debris, comprising: removing debris from the capsule; and substantially cleaning the capsule of the debris with the extraction device as in any one of the extraction devices disclosed herein. In some embodiments, the method further comprising rotating the screw within the capsule, wherein the proximal end of the capsule comprises an external wing, wherein rotating the screw causes the wing and sides of the capsule to engage. In some embodiments, engagement of the capsule causes the wing and sides of the capsule to deform. In some embodiments, the capsule is engaged by applying pressure on the sides and wing of the capsule.

DETAILED DESCRIPTION OF THE PREFERRED EMBODIMENT

The present application provides an extraction device for cleaning a capsule, comprising a retainer, a plunger and an extraction screw. In some embodiments, the extraction device comprises a retainer, a plunger and a rotative screw. In further embodiments, the extraction device further comprises a feeder. In further embodiments, the extraction device further comprises a transport system.

The present embodiments also provide methods of reusing a beverage capsule. Another embodiment is a method of cleaning a capsule of debris including removing debris from the capsule and substantially cleaning the capsule of the debris with an extraction device described herein. In some embodiments, further comprising rotating the screw within the capsule.

Some embodiments relate to beverage preparation device comprising any of the various extraction devices described herein. In some embodiments, the beverage preparation device is a machine for dispensing coffee, tea, or other heated beverage. In other embodiments, the beverage preparation device is for dispensing a cold or room temperature beverage.

Extraction Screw

Figure 1A:
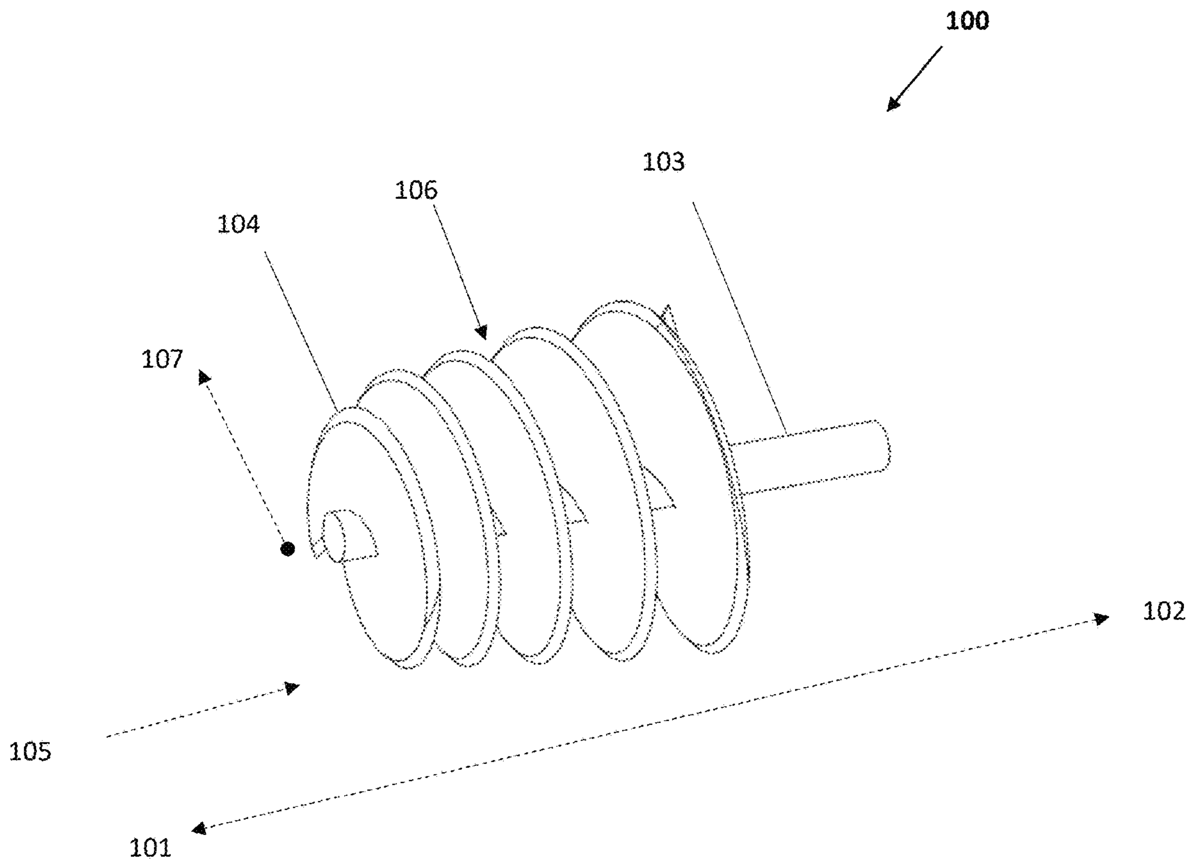
FIG. 1A is an elevated side perspective view of a screw, according to one embodiment.
Figure 1B:
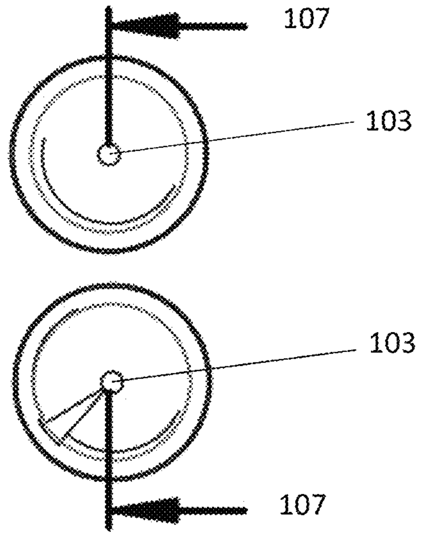
FIG. 1B is a top side plane perspective view of the screw as also shown in FIG. 1A.
Figure 1C:
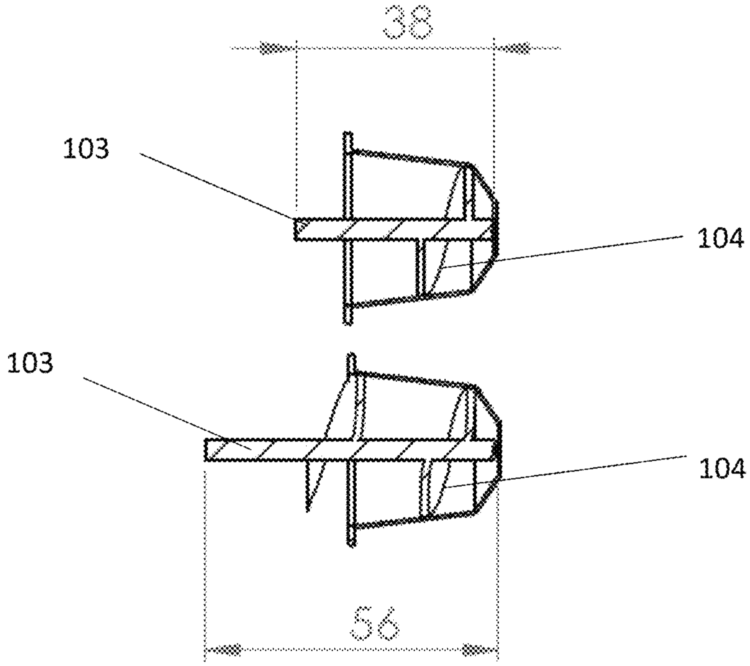
FIG. 1C is a side plane perspective view of the screw as also shown in FIG. 1A.

Some embodiments of the present disclosure relate to a screw comprising a shaft and at least one thread in the shape of a helical spiral positioned at the distal portion of the shaft. In some embodiments, the helical spiral is defined by the outer edge of the thread. As shown in FIG. 1A, a screw 100 includes a shaft 103 and a thread 104 in the shape of a helical spiral positioned at the distal portion 101 of the shaft 103. The helical spiral is defined by the outer edge 105 of the thread 104. The helical spirals further include a pitch 106 and a radius 107. FIG. 1B is a top side plane perspective view of screw 100. FIG. 1C is a side plane perspective view of screw 100, illustrating various lengths of shaft 103. As used herein, the "distal end" or "distal portion" refers to the end further from the observer or inner portion of the device or screw. As used herein, the "proximal end" or "proximal portion" refers to the end closer to the observer or outer portion of the device or screw.

Figure 2A:
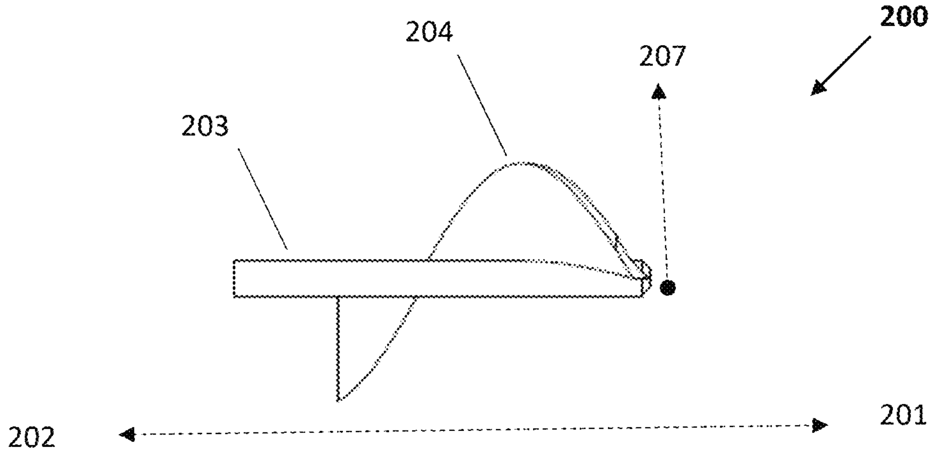
FIG. 2A is a side plane perspective view of a screw, according to one embodiment.
Figure 2B:
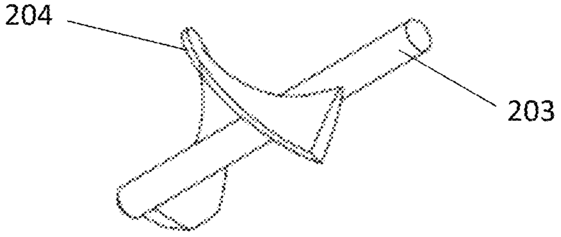
FIG. 2B is an elevated side perspective view of the screw as also shown in FIG. 2A.
Figure 2C:
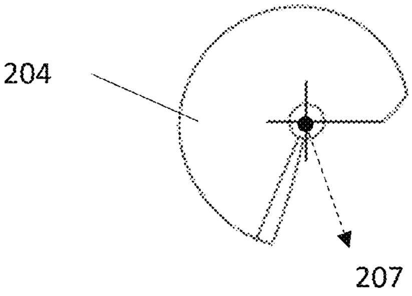
FIG. 2C is a top side plane perspective view of the screw as also shown in FIG. 2A.

FIG. 2A illustrates a side plane perspective view of a screw 200, and FIGS. 2B and 2C illustrate screw 200 in an elevated side perspective view and a top side plane perspective view, respectively. With combined reference to FIGS. 2A, 2B, and 2C, screw 200 includes a shaft 203 and a thread 204 in the shape of a helical spiral positioned at the distal portion 201 of the shaft 203. The helical spirals further includes radius 207.

In some embodiments, the pitch of the helical spirals may be of, of about, of at least, or at least about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, about 50 mm, about 51 mm, about 52 mm, about 53 mm, about 54 mm, about 55 mm, about 56 mm, about 57 mm, about 58 mm, about 59 mm, about 60 mm, about 61 mm, about 62 mm, about 63 mm, about 64 mm, about 65 mm, about 66 mm, about 67 mm, about 68 mm, about 69 mm, about 70 mm, about 71 mm, about 72 mm, about 73 mm, about 74 mm, about 75 mm, or any range of values therebetween. For example, in some embodiments, the pitch of the helical spirals is or is about in any one of the following ranges: about 1 mm to about 10 mm, about 5 mm to about 15 mm, about 5 mm to about 10 mm, about 10 mm to about 20 mm, about 20 mm to about 30 mm, about 30 mm to about 40 mm, about 40 mm to about 50 mm, about 5 mm to about 50 mm, or about 5 mm to about 20 mm or any range of values therebetween.

In some embodiments, the helical spiral encompasses a turn. In some embodiments, the helical spiral encompasses a turn of, of about, of at least, or at least about 45°, about 90°, about 135°, about 180°, about 225°, about 270°, about 315°, about 360°, about 405°, about 450°, about 495°, about 540°, about 585°, about 630°, about 675°, about 720°, about 765°, about 810°, about 855°, about 900°, about 945°, about 990°, about 1,035°, about 1,080°, about 1,125°, about 1,170°, about 1,215°, about 1,260°, about 1,305°, about 1,350°, about 1,395°, about 1,440°, about 1,485°, about 1,530°, about 1,575°, about 1,620°, about 1,665°, about 1,710°, about 1,755°, about 1,800°, about 1,845°, about 1,890°, about 1,935°, about 1,980°, about 2,025°, about 2,070°, about 2,115°, about 2,160°, about 2,205°, about 2,250°, about 2,295°, about 2,340°, about 2,385°, about 2,430°, about 2,475°, about 2,520°, about 2,565°, about 2,610°, about 2,655°, about 2,700°, about 2,745°, about 2,790°, about 2,835°, about 2,880°, about 2,925°, about 2,970°, about 3,015°, about 3,060°, about 3,105°, about 3,150°, about 3,195°, about 3,240°, about 3,285°, about 3,330°, about 3,375°, about 3,420°, about 3,465°, about 3,510°, about 3,555°, or about 3,600°, or any range of values therebetween. For example, in some embodiments, the helical spiral encompasses a turn of or of about in any one of the following ranges: about 90° to about 180°, about 180° to about 240°, about 240° to about 360°, about 360° to about 720°, about 720° to about 1,440°, or about 1,800° to about 3,600° or any range of values therebetween.

In some embodiments, the radius of the spiral is constant. In some embodiments, the radius of the spiral increases from zero to a predetermined length. In some embodiments, the radius of the spiral is of, of about, of at least, or at least about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, about 50 mm, about 51 mm, about 52 mm, about 53 mm, about 54 mm, about 55 mm, about 56 mm, about 57 mm, about 58 mm, about 59 mm, or about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, about 125 mm, about 130 mm, about 135 mm, about 140 mm, about 145 mm, about 150 mm, about 155 mm, about 160 mm, about 165 mm, about 170 mm, about 175 mm, about 180 mm, about 185 mm, about 190 mm, about 195 mm, about 200 mm, about 205 mm, about 210 mm, about 215 mm, about 220 mm, about 225 mm, about 230 mm, about 235 mm, about 240 mm, about 245 mm, or about 250 mm, or any range of values therebetween. For example, in some embodiments, the radius of the spiral is of or of about in any one of the following ranges: about 1 mm to about 200 mm, about 1 mm to about 10 mm, about 0 mm to about 60 mm, about 5 mm to about 50 mm, about 50 mm to about 100 mm, about 5 mm to about 20 mm, or about 1 mm to about 30 mm or any range of values therebetween. In some embodiments, the screw substantially contours to the capsule.

In some embodiments, the length of the shaft is of, of about, of at least, or at least about 10 mm, about 15 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, about 50 mm, about 51 mm, about 52 mm, about 53 mm, about 54 mm, about 55 mm, about 56 mm, about 57 mm, about 58 mm, about 59 mm, about 60 mm, about 65 mm, about 70 mm, about 75 mm, about 80 mm, about 85 mm, about 90 mm, about 95 mm, about 100 mm, about 105 mm, about 110 mm, about 115 mm, about 120 mm, about 125 mm, about 130 mm, about 135 mm, about 140 mm, about 145 mm, about 150 mm, about 155 mm, about 160 mm, about 165 mm, about 170 mm, about 175 mm, about 180 mm, about 185 mm, about 190 mm, about 195 mm, about 200 mm, about 205 mm, about 210 mm, about 215 mm, about 220 mm, about 225 mm, about 230 mm, about 235 mm, about 240 mm, about 245 mm, or about 250 mm, or any range of values therebetween. For example, in some embodiments, the length of the shaft is of or of about in any one of the following ranges: about 30 mm to about 200 mm, about 25 mm to about 35 mm, about 25 mm to about 50 mm, about 50 mm to about 200 mm, or about 100 mm to about 250 mm or any range of values therebetween.

Figure 3A:
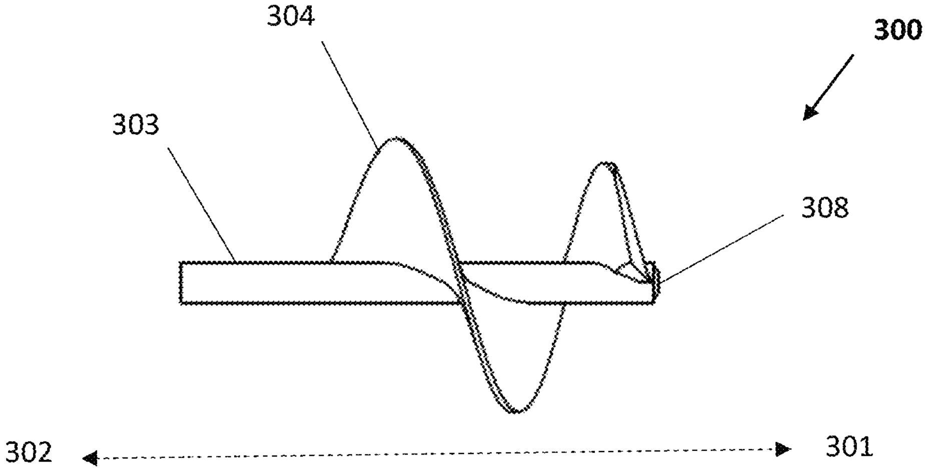
FIG. 3A is a side plane perspective view of a screw, according to one embodiment.
Figure 3B:
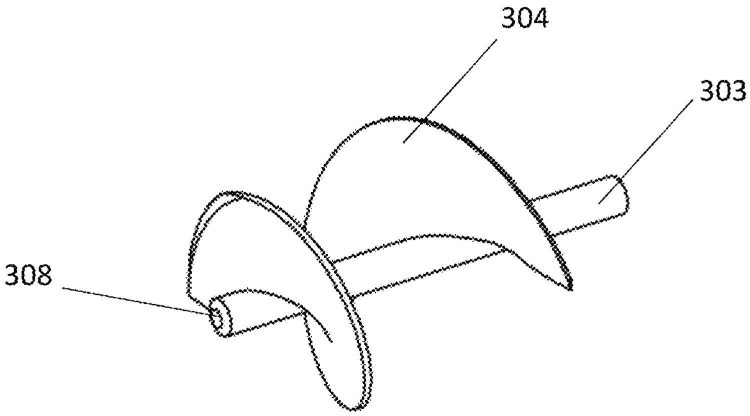
FIG. 3B is an elevated side perspective view of the screw as also shown in FIG. 3A.
Figure 3C:
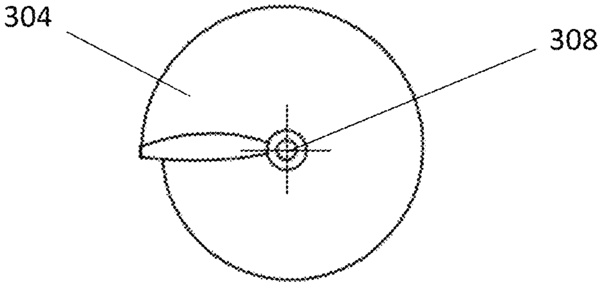
FIG. 3C is a bottom plane view of the screw as also shown in FIG. 3A.

FIG. 3A illustrates a side plane perspective view of a screw 300, and FIGS. 3B and 3C illustrate screw 300 in an elevated side perspective view and a bottom plane view, respectively. With combined reference to FIGS. 3A, 3B, and 3C, screw 300 includes a shaft 303 and a thread 304 in the shape of a helical spiral positioned at the distal portion 301 of the shaft 303. The shaft 303 includes a cavity extending through the length of shaft 303 and an outlet 308 positioned at the distal end 301 of the shaft 303. In some embodiments, the shaft comprises a cavity extending through the length of shaft. In some embodiments, the shaft comprises an outlet positioned at the distal end of the shaft. In some embodiments, the screw substantially contours to the capsule, and the outlet is configured to eject a gaseous or liquid solution. In some embodiments, the outlet is configured to eject a gas. In some embodiments, the outlet is configured to eject a liquid solution.

Figure 4:
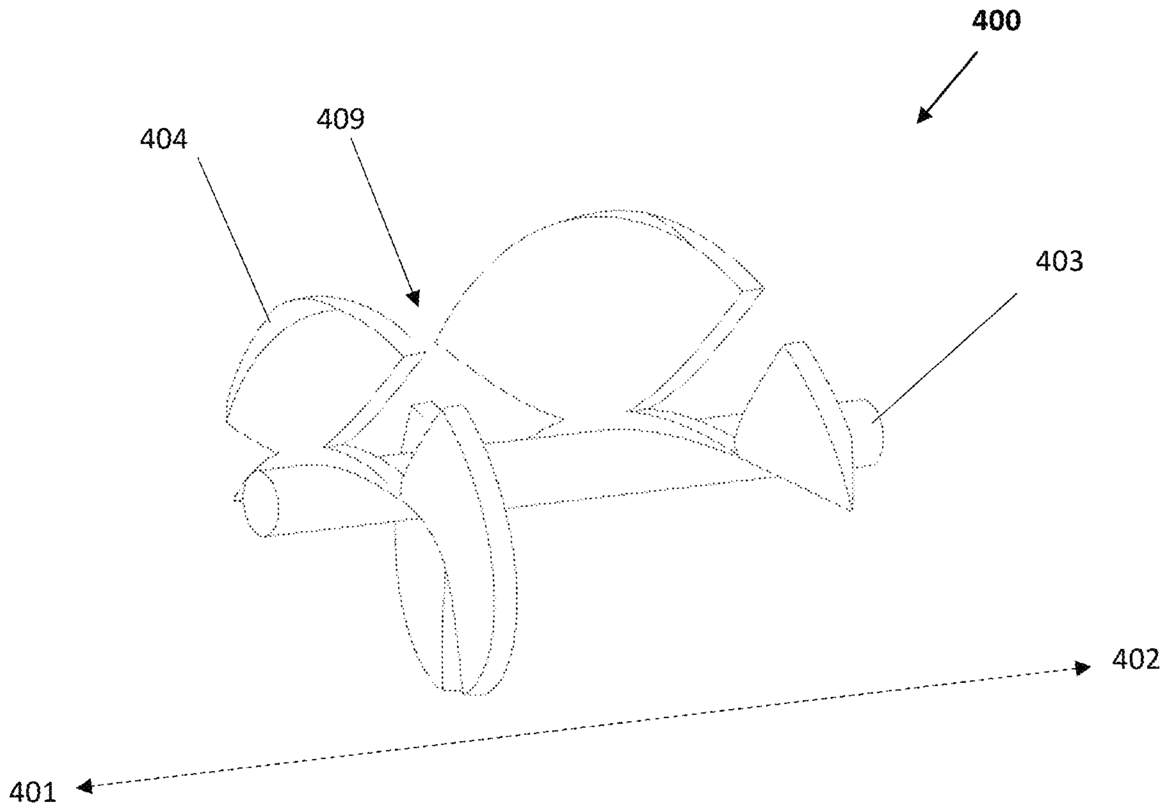
FIG. 4 is an elevated side perspective view of a screw, according to one embodiment.

As shown in FIG. 4, a screw 400 includes a shaft 403 and a thread 404 in the shape of a helical spiral positioned at the distal portion 401 of the shaft 403. The helical spirals are configured to have a plurality of gap slots 409 within the helical spirals. In some embodiments, the helical spirals are configured to have a plurality of gap slots within the helical spirals. In some embodiments, the gap slots within the helical spirals is of, of about, of at least, or at least about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, or any range of values therebetween. For example, in some embodiments, the gap slots within the helical spirals is of or of about in any one of the following ranges: about 1 mm 10 to about mm, about 10 mm to about 15 mm, about 5 mm to about 20 mm, or about 1 to about 25 mm or any range of values therebetween.

Figure 5A:
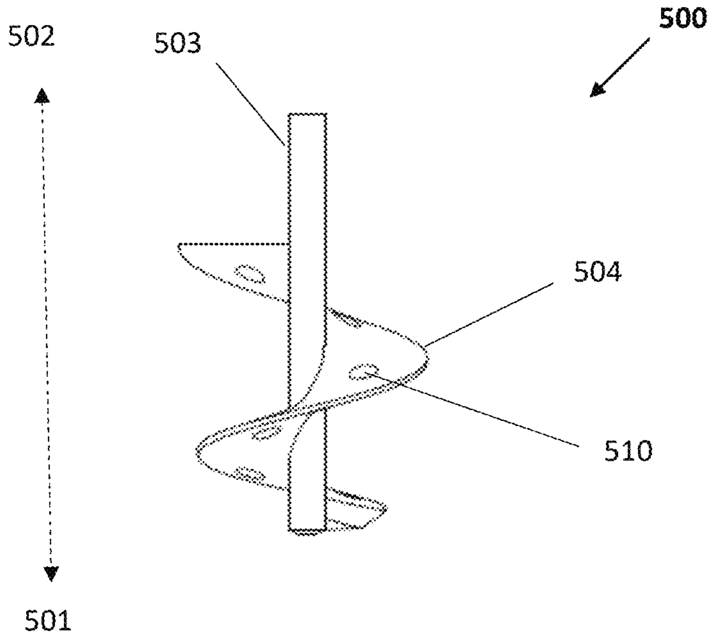
FIG. 5A is a front perspective view of a screw, according to one embodiment.
Figure 5B:
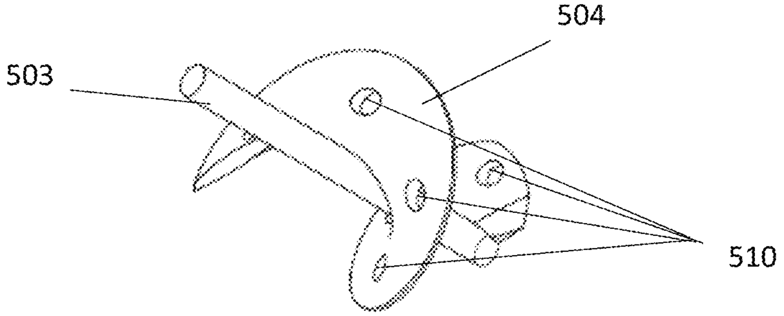
FIG. 5B is an elevated side perspective view of the screw as also shown in FIG. 5A.
Figure 5C:
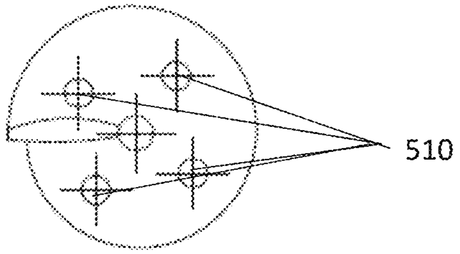
FIG. 5C is a bottom plane view of the screw as also shown in FIG. 5A.

FIG. 5A illustrates a front perspective view of a screw 500, and FIGS. 5B and 5C illustrate screw 500 in an elevated side perspective view and a bottom plane view, respectively. With combined reference to FIGS. 5A, 5B, and 5C, screw 500 includes a shaft 503 and a thread 504 in the shape of a helical spiral positioned at the distal portion 501 of the shaft 503. The helical spirals are configured to have a plurality of apertures 510 within the helical spirals. In some embodiments, the helical spirals are configured to have a plurality of apertures within the helical spirals. In further embodiments, the helical spirals are configured to have a plurality of apertures within the helical spirals for the passage of debris. In some embodiments, a plurality of apertures within the helical spirals are substantially circular.

Rotative Screw

Some embodiments of the present disclosure relate to a rotative screw for cleaning a capsule. In some embodiments, the rotative screw comprises a central shaft and at least one fin positioned at the distal end of the shaft. In some embodiments, the at least one fin comprises: a first linear section oriented along the horizontal axis of the shaft; a first angled section extending from the first linear section, the first angled section comprising an outwardly-angled portion that angles outwardly from the first linear section; and a first vertical section oriented along the vertical axis of the shaft, the first vertical section extending from the first angled section, such that the screw substantially contours to the capsule. In some embodiments, at least one fin is substantially solid from the first linear section to the radius of the shaft.

Figure 6A:
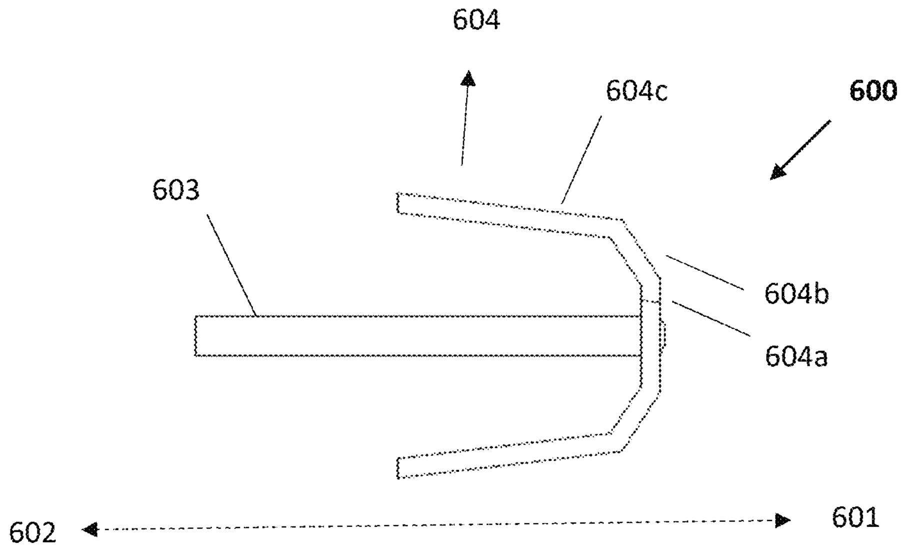
FIG. 6A is a side plane view of a screw, according to one embodiment.
Figure 6B:
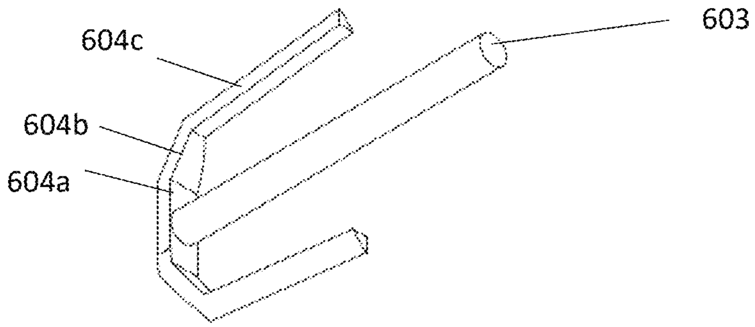
FIG. 6B is an elevated side perspective view of the screw as also shown in FIG. 6A.
Figure 6C:
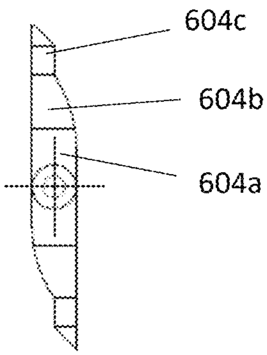
FIG. 6C is a top plane view of the screw as also shown in FIG. 6A.

FIG. 6A illustrates a side plane view of a screw 600, and FIGS. 6B and 6C illustrate screw 600 in an elevated side perspective view and a top plane view, respectively. With combined reference to FIGS. 6A, 6B, and 6C, screw 600 includes a central shaft 603 and a fin 604 positioned at the distal end 601 of the shaft 603. Fin 604 includes a first linear section 604*a* oriented along the horizontal axis of the shaft 603; a first angled section 604*b* extending from the first linear section 604*a*; and a first vertical section 604*c* oriented along the vertical axis of the shaft 603. The first angled section 604*b* includes an outwardly-angled portion that angles outwardly from the first linear section 604*a*. The first vertical section 604*c* extends from the first angled section 604*b*.

Figure 7A:
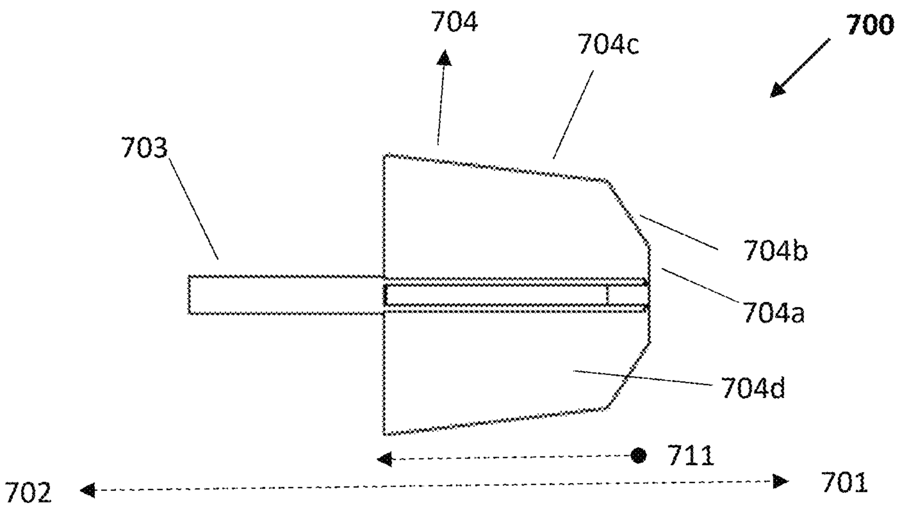
FIG. 7A is a side plane view of a screw, according to one embodiment.
Figure 7B:
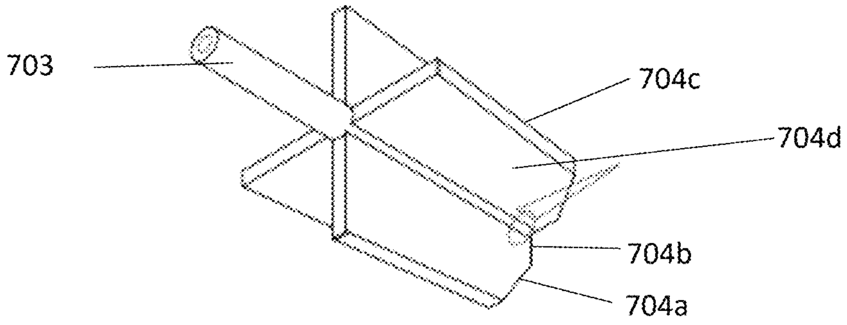
FIG. 7B is an elevated side perspective view of the screw as also shown in FIG. 7A.
Figure 7C:
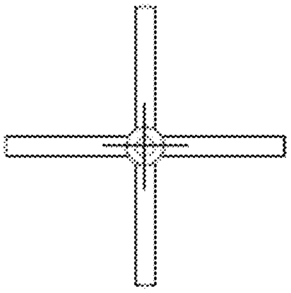
FIG. 7C is a top plane view of the screw as also shown in FIG. 7A.

FIG. 7A illustrates a side plane view of a screw 700, and FIGS. 7B and 7C illustrate screw 700 in an elevated side perspective view and a top plane view, respectively. With combined reference to FIGS. 7A, 7B, and 7C, screw 700 includes a central shaft 703 and a fin 704 positioned at the distal end 701 of the shaft 703. Fin 704 includes a first linear section 704*a* oriented along the horizontal axis of the shaft 703; a first angled section 704*b* extending from the first linear section 704*a*; and a first vertical section 704*c* oriented along the vertical axis of the shaft 703. The first angled section 704*b* includes an outwardly-angled portion that angles outwardly from the first linear section 704*a*. The first vertical section 704*c* extends from the first angled section 604*b*. At least one fin 704*d* is substantially solid from the first linear section 704*a* to the radius 711 of the shaft 703.

Figure 8A:
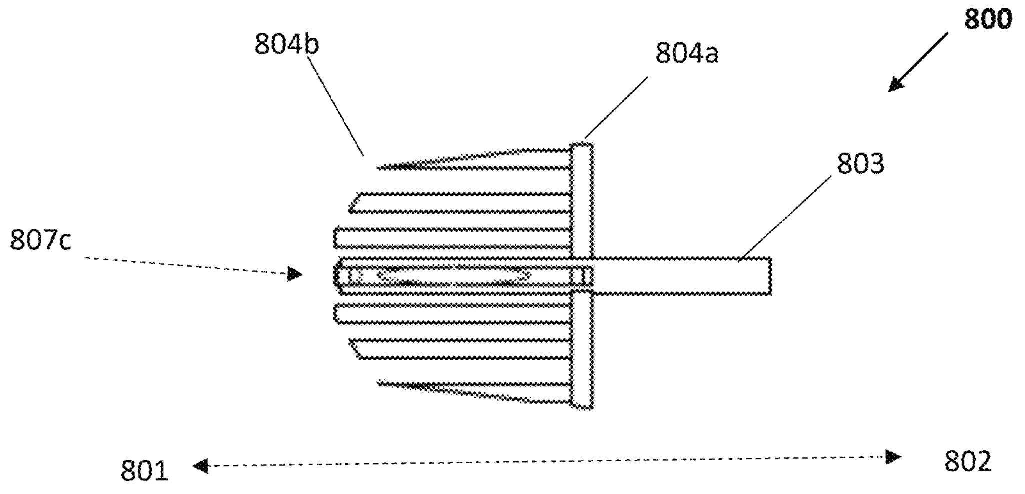
FIG. 8A is a side plane view of a screw, according to one embodiment.
Figure 8B:
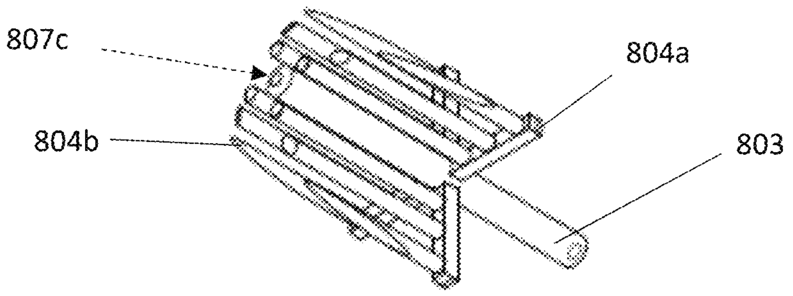
FIG. 8B is an elevated side perspective view of the screw as also shown in FIG. 8A.
Figure 8C:
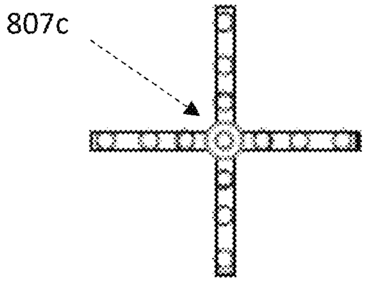
FIG. 8C is a bottom plane view of the screw as also shown in FIG. 8A.

FIG. 8A illustrates a side plane view of a screw 800, and FIGS. 8B and 8C illustrate screw 800 in an elevated side perspective view and a bottom plane view, respectively. With combined reference to FIGS. 8A, 8B, and 8C, screw 800 includes a central shaft 803 and at least one linear section 804*a* positioned at the distal end 801 of the shaft 803. The linear section 804*a* is oriented along the horizontal axis of the shaft 803. The linear section 804*a* includes a plurality of prongs 804*b* extending distally 801 from the linear section 804*a*. The distal end 801 of the plurality of prongs 804*b* are substantially needle shaped. The outer edges of the plurality of prongs are angled inward towards the center 807*c* of the shaft 803. In some embodiments, the rotative screw comprises a central shaft and at least one linear section positioned at the distal end of the shaft, wherein the at least one linear section oriented along the horizontal axis of the shaft, wherein the at least one linear section comprises a plurality of prongs extending distally from the linear section, wherein the distal end of the plurality of prongs are substantially needle shaped, wherein the outer edges of the plurality of prongs are angled inward towards the center of the shaft, such that the screw substantially contours to the capsule.

In some embodiments, the first vertical section angles outwardly from the first angled section of, of about, of at least, or at least about 0°, about 1°, about 2°, about 3°, about 4°, about 5°, about 6°, about 7°, about 8°, about 9°, about 10°, about 11°, about 12°, about 13°, about 14°, about 15°, about 16°, about 17°, about 18°, about 19°, about 20°, about 21°, about 22°, about 23°, about 24°, about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, about 45°, about 46°, about 47°, about 48°, about 49°, about 50°, about 51°, about 52°, about 53°, about 54°, about 55°, about 56°, about 57°, about 58°, about 59°, or about 60°, or any range of values therebetween, relative to the vertical axis. For example, in some embodiments, the first vertical section angles outwardly from the first angled section of or of about in any one of the following ranges: about 0° to about 60° or about 0° to about 45°, or any range of values therebetween, relative to the vertical axis.

Extraction Device

Some embodiments of the present disclosure relate to an extraction device for cleaning a capsule. In some embodiments, the extraction device comprises a retainer, a plunger, and a screw. In some embodiments, the screw is an extraction screw. In other embodiments, the screw is a rotative screw. In some embodiments, the extraction device further comprises a handle positioned at the proximal end of the plunger. In some embodiments, the extraction device comprises a diverter. In some embodiments, the extraction device comprises one or more containers.

In some embodiments, the extraction device comprises a feeder system. In some embodiments, the extraction device comprises a screw, a feeder system, and a retainer.

In some embodiments, the extraction device comprises a transport system. In some embodiments, the transport system is configured to displace the retainer towards the screw. In some embodiments, the extraction device comprises a screw, a feeder system, a retainer, and a transport system. In some embodiments, the transport system further comprises a fastening system. In some embodiments, the transport system comprises an axle and a pin.

In some embodiments, the extraction device comprises a fastening system. In some embodiments, the fastening system comprises an axle and a pin. In some embodiments, the fastening system comprises an anchor. In some embodiments, the fastening system is an axle and a pin. In some embodiments, the fastening system is an anchor.

In some embodiments, the retainer is positioned at a distal end of the extraction device. In some embodiments, the plunger is positioned at a proximal end of the extraction device. In some embodiments, the screw is disposed between the plunger and the retainer. In some embodiments, the proximal end of the screw extends from the distal end of the plunger. In some embodiments, the plunger is configured to press the screw along the vertical axis of the extraction device. In some embodiments, the plunger is configured to press the screw along the horizontal axis of the extraction device.

Figure 9A:
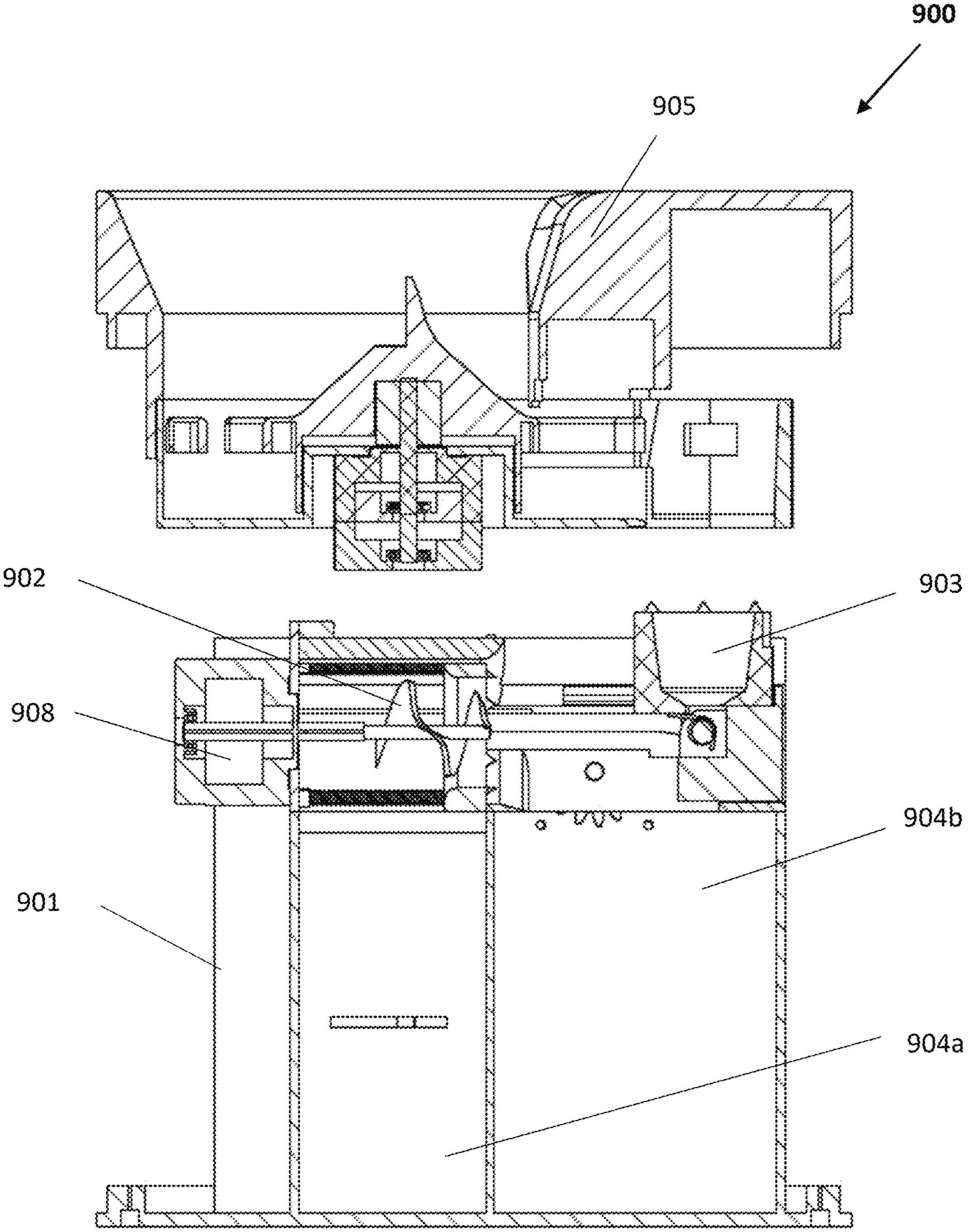
FIG. 9A is a side view of an extraction device, according to one embodiment.
Figure 9B:
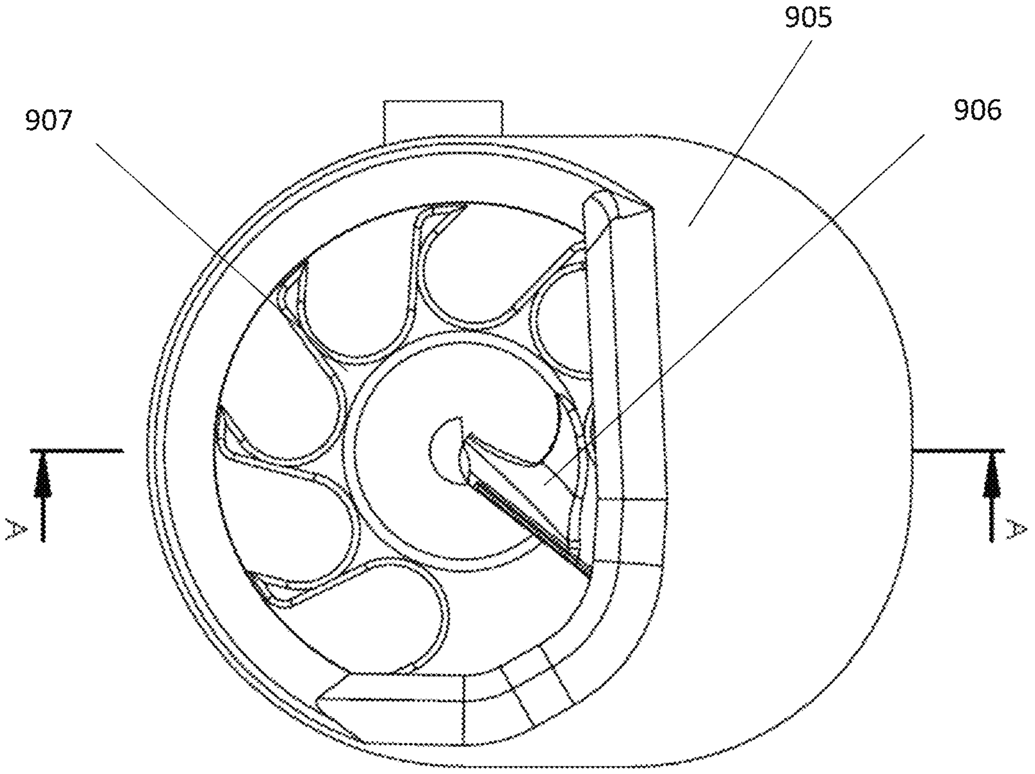
FIG. 9B is a top side plane view of the extraction device as also shown in FIG. 9A.

For example, FIG. 9A is a side view of an extraction device 900, and FIG. 9B illustrate the extraction device 900 in a top side plane view. With combined reference to FIGS. 9A and 9B, extraction device 900 includes: housing 901; screw 902; retainer 903; containers 904*a* and 904*b*; cap 905; diverter 906; capsule feeder system 907; and plunger 908. In some embodiments, diverter 906 and feeder system 907 are configured to place a capsule into the retainer 903 in a vertical orientation. In some embodiments, plunger 908 is configured to press screw 902 along the horizontal axis of extraction device 900. In some embodiments, container 904*a* is configured to collect and store debris extracted from capsules. In other embodiments, container 904*b* is configured to collect and store capsules after being substantially cleaned of the debris with extraction device 900.

Feeder System

Figure 10A:
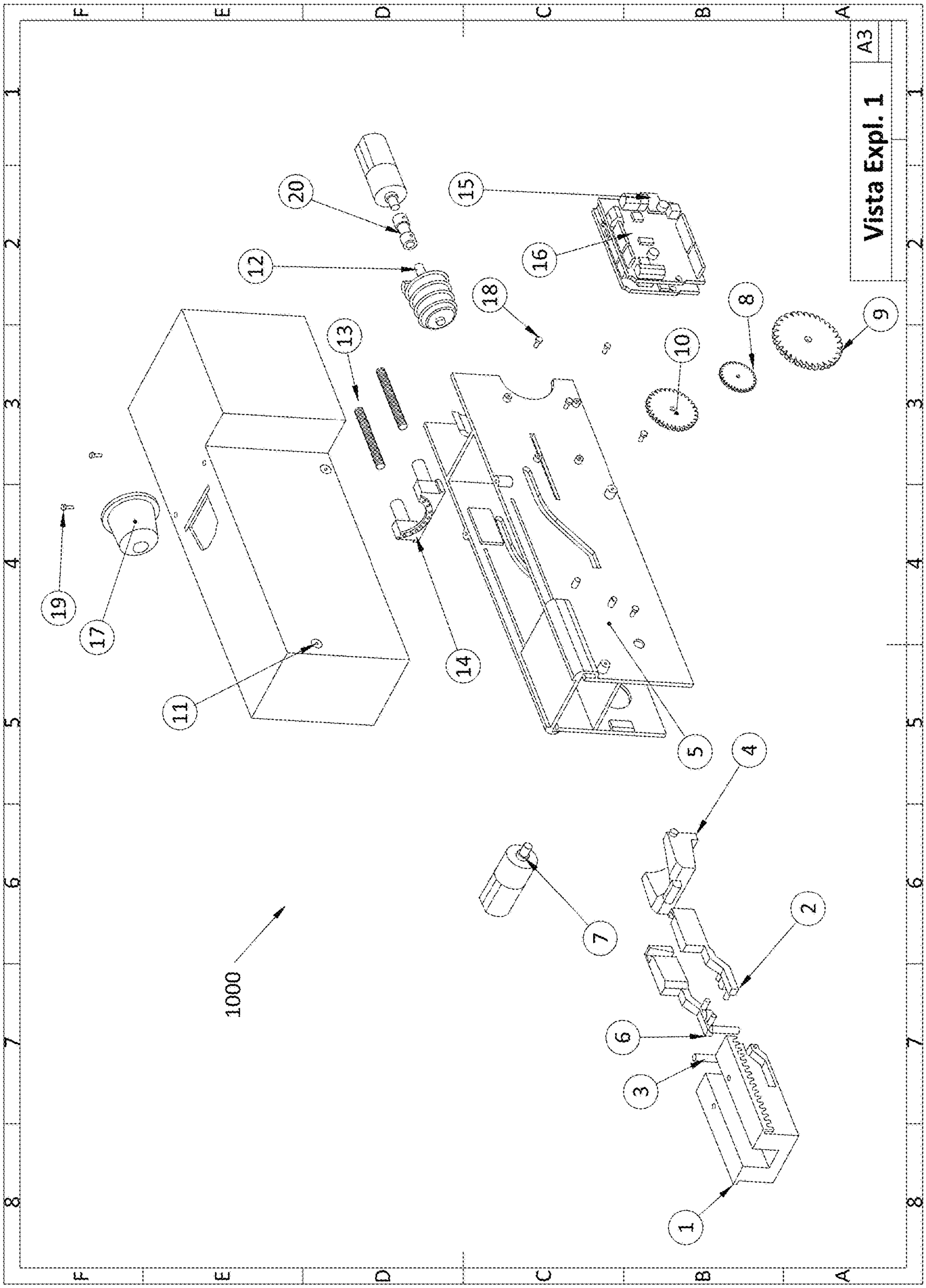
FIG. 10A is an exploded schematic image of an extraction device, including its component parts, configured to place a capsule into a retainer in a horizontal orientation, according to one embodiment.
Figure 10C:
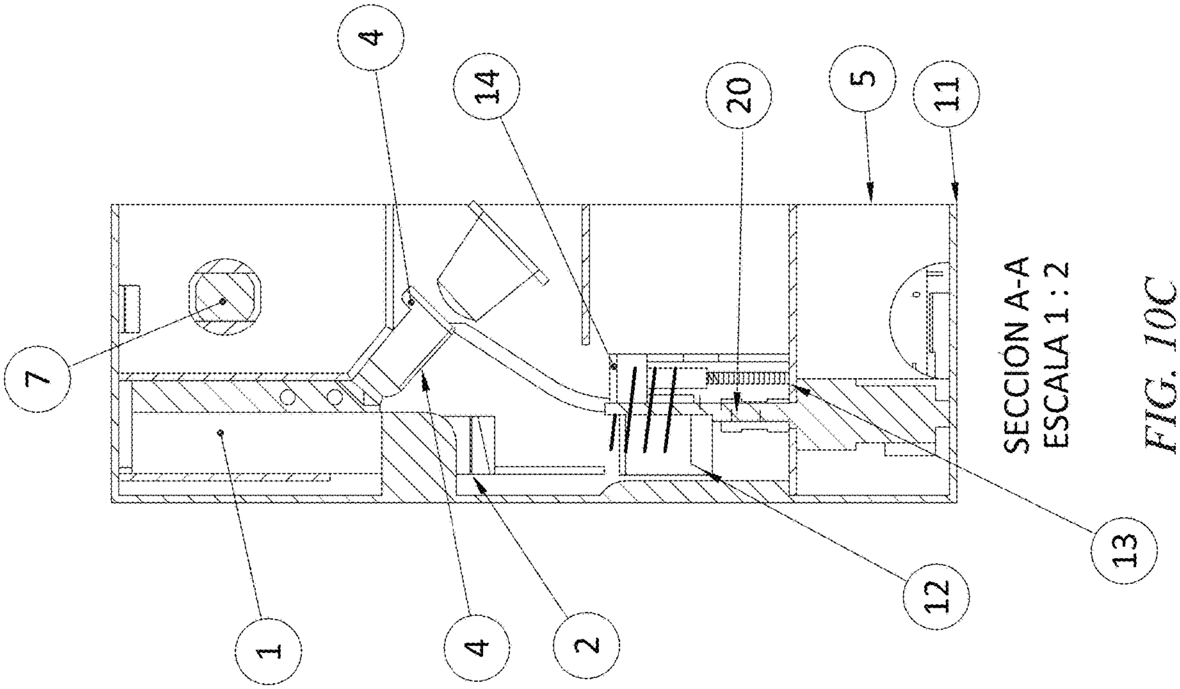
FIG. 10C is a top side plane view of the extraction device as also shown in FIG. 10A.
Figure 10B:
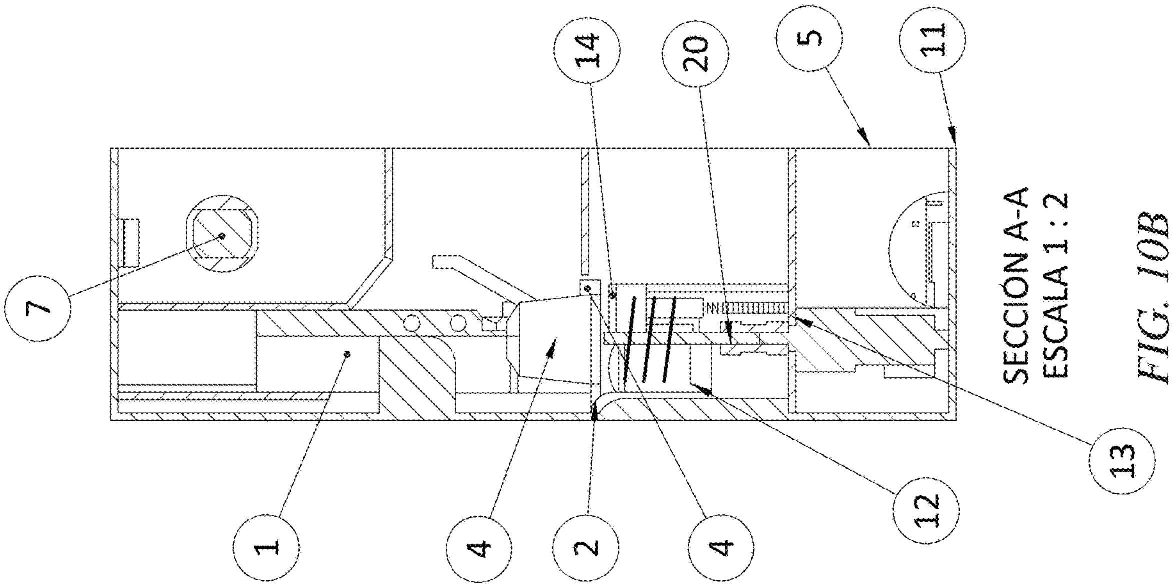
FIG. 10B is a top side plane view of the extraction device as also shown in FIG. 10A.

Some embodiments of the present disclosure relate to a feeder system configured to place a capsule into the retainer. In some embodiments, the feeder system is configured to place a capsule into the retainer in a horizontal orientation. By way of example, FIG. 10A is an exploded schematic image of an extraction device 1000, including its component parts, configured to place a capsule into a retainer in a horizontal orientation, and FIGS. 10B and 10C illustrate the extraction device 1000 in a top side plane view.

Figure 11A:
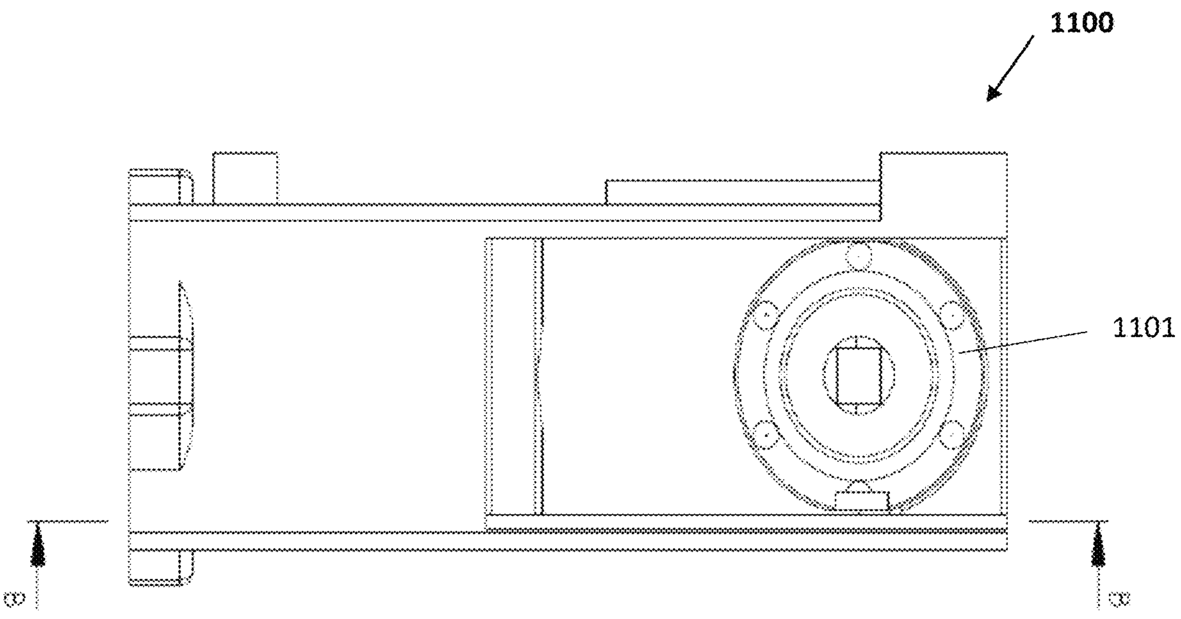
FIG. 11A is an image of an extraction device configured to place a capsule into a retainer in a vertical orientation, according to one embodiment.
Figure 11B:
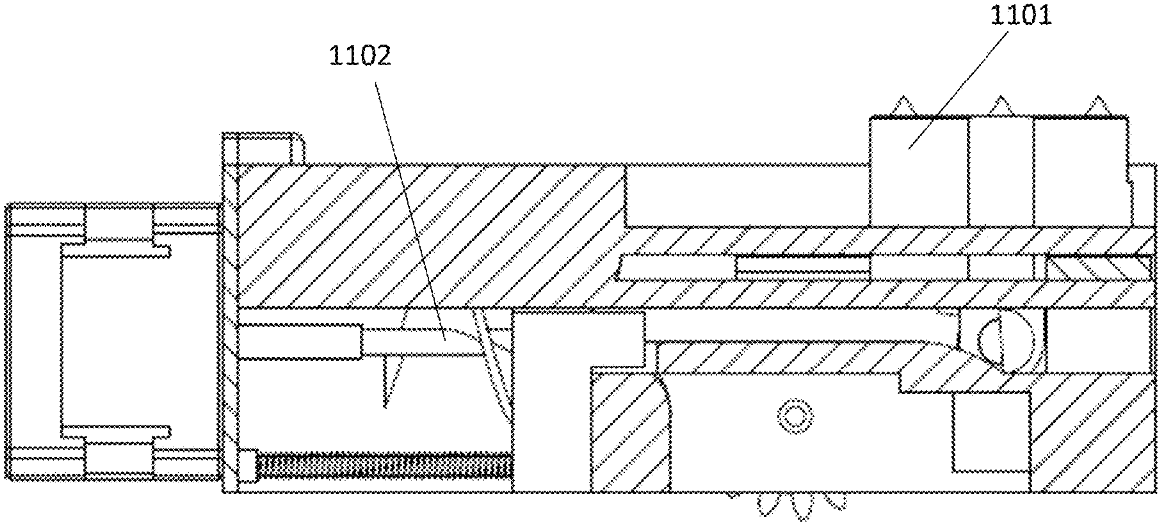
FIG. 11B is a side plane view of the extraction device as also shown in FIG. 11A.

In some embodiments, the feeder system is configured to place a capsule into the retainer in a vertical orientation. FIGS. 11A and 11B are images of an extraction device 1100 configured to place a capsule into a retainer in a vertical orientation. With combined reference to FIGS. 11A and 11B, extraction device 1100 incudes retainer 1101, configured in a vertical orientation, and screw 1102. In some embodiments, retainer 1101 is attached to a rail. In some embodiments the rail is configured to disposed through a slot located at the body of extraction device 1100.

Figure 12A:
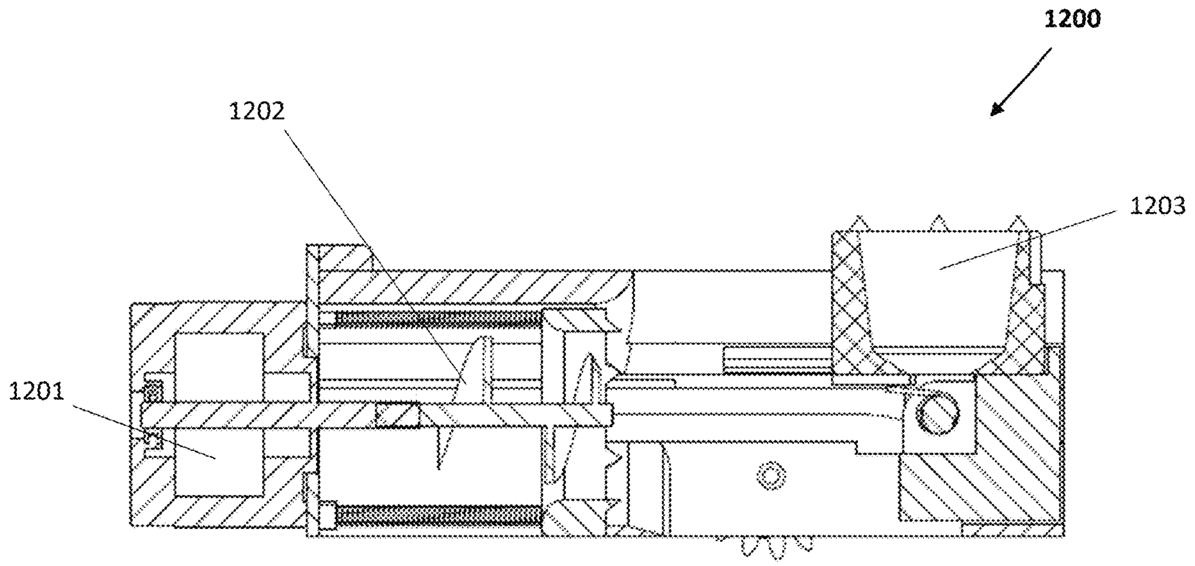
FIG. 12A is an image of an extraction device configured to place a capsule into a retainer in a vertical orientation with an axle and pin configured to turn the retainer by 90°, according to one embodiment.
Figure 12B:
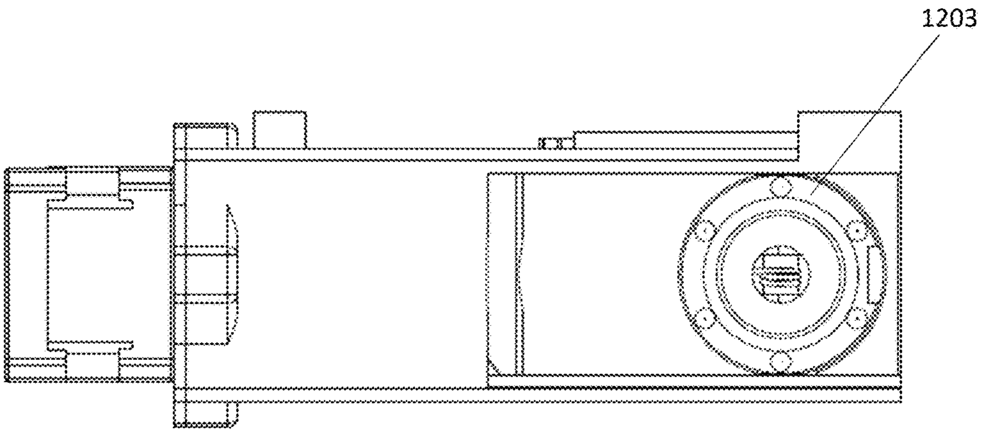
FIG. 12B is a side plane view of the extraction device as also shown in FIG. 12A.

FIG. 12A is an image of an extraction device 1200, and FIG. 12B illustrates the extraction device 1200 in a top side plane view. With combined reference to FIGS. 12A and 12B, extraction device 1200 incudes plunger 1201; screw 1202; and retainer 1203. In some embodiments, extraction device 1200 is configured to place a capsule into retainer 1203 in a vertical orientation. In further embodiments, extraction device 1200 further includes an axle and pin configured to turn the retainer 1203 by 90°.

Fastening System

Some embodiments of the present disclosure relate to a fastening system configured to restrain the capsule. In some embodiments, the fastening system is configured to prevent rotation of the capsule. In some embodiments, the fastening system is configured to apply pressure to the lateral ends of the capsule. In some embodiments, the fastening system is configured to apply pressure to the proximal end of the capsule. In some embodiments, the fastening system is configured to deform the proximal end of the capsule.

In some embodiments, the fastening system comprises a locking mechanism. In some embodiments, the locking mechanism secures the fastening system to the capsule. In some embodiments, the locking mechanism secures the fastening system to the retainer. In some embodiments, the fastening system is configured to anchor to the retainer. In some embodiments, the fastening system is configured to couple to the retainer. In some embodiments, the fastening system is configured to anchor the retainer in a predetermined orientation.

In some embodiments, the fastening system comprises means for coupling to the capsule. In some embodiments, the fastening system comprises means for coupling to the retainer.

In some embodiments, the fastening system comprises an axle and a pin. In some embodiments, the axle and the pin are configured to orient the retainer from a vertical orientation to a horizontal orientation. In some embodiments, the axle and the pin are configured to orient the retainer from a horizontal orientation to a vertical orientation. In further embodiments, the axle and the pin are configured to apply pressure to the capsule.

FIG. 10A illustrates an exploded schematic image of an extraction device 1000, and FIGS. 10B and 10C illustrate the extraction device 1000 in a top side plane view. With combined reference to FIGS. 10A, 10B, and 10C, extraction device 1000 includes: transport system 1; pins 2 and 6; stud 3; hatch 4; structural system 5; motor 7; central gear 8; main gear 9; top gear 10; external case 11; screw 12; tack 13; axle 14; electrical systems 15 and 16; capsule 17; bolts 18 and 19; and plunger 20. Pins 2 and 6 are configured to apply pressure to the lateral ends of capsule 17. Further, axle 14 is configured to apply pressure to the proximal end of the capsule. In some embodiments, axle 14 is configured to deform the proximal end of capsule 17. Together, pins 2 and 6 and axle 14 are configured to restrain the capsule 17 and prevent the rotation of capsule 17.

Figure 13A:
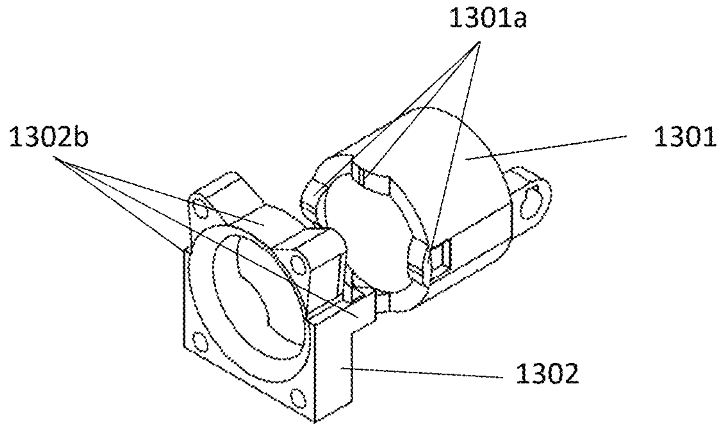
FIG. 13A is an elevated side perspective view of a retainer and an anchor, according to one embodiment.
Figure 13B:
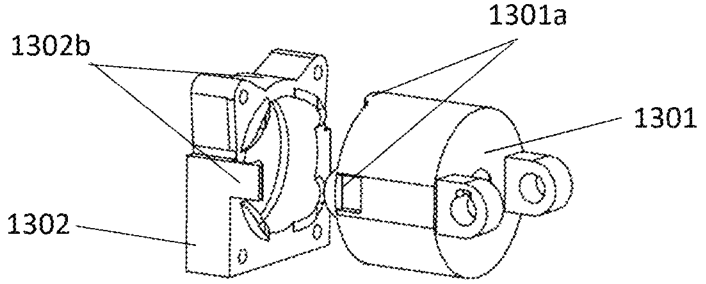
FIG. 13B is a back side plane view of the retainer and anchor as also shown in FIG. 13A.
Figure 13C:
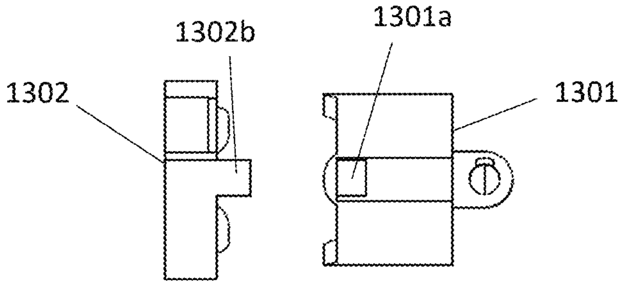
FIG. 13C is a side plane view of the retainer and anchor as also shown in FIG. 13A.

In some embodiments, the fastening system comprises an anchor. In some embodiments, the anchor comprises means for coupling to the capsule. In some embodiments, the anchor comprises means for coupling to the retainer. In some embodiments, the anchor comprises a locking mechanism. In some embodiments, the anchor couples to the retainer. In some embodiments, the anchor is configured to anchor the retainer in a predetermined orientation. For example, FIG. 13A illustrates an elevated side perspective view of retainer 1301 and anchor 1302, and FIGS. 13B and 13C illustrate the retainer 1301 and anchor 1302 in a back side plane view and a side plane view, respectively. With combined reference to FIGS. 13A, 13B, and 13C, anchor 1302 includes a locking mechanism 1302*b* as a means for coupling 1302 to retainer 1301 through physical engagement with component 1301*a*. Other means for coupling 1302 to retainer 1301 include pins, bolts, removable fasteners (sure as Velcro®-brand fasteners), low-intensity magnetic attachments, and the like.

Diverter

Some embodiments of the present disclosure relate to a diverter configured to sequence a plurality of capsules. In some embodiments, the diverter further comprises a full or partial cover for the extraction device. In further embodiments, the diverter further comprises a lid. In some embodiments, the diverter further comprises one or sensors.

Electrical System

In some embodiments, the extraction device comprises one or more electrical systems. In some embodiments, the electrical system comprises one or more sensors. In some embodiments, for example, the sensors are selected from a proximity sensor, load sensor, strain gauge, accelerometer, and gyroscope.

In some embodiments, the extraction device includes a gyroscope configured to determine the rotation of the extraction device. In some embodiments, the extraction device includes an accelerometer configured to determine the motion of the extraction device. In some embodiments, the extraction device is configured to automatically shutoff after rotation of the extraction device is detected. In some embodiments, the extraction device is configured to automatically shutoff or not turn on if the lid is partially or fully opened.

In some embodiments, the sensors are configured to detect the mass or volume content of the one or more containers. In some embodiments, the sensors are configured to detect the content of debris within the extraction device. In some embodiments, the electrical system includes a display element.

Beverage Preparation Device

Figure 14A:
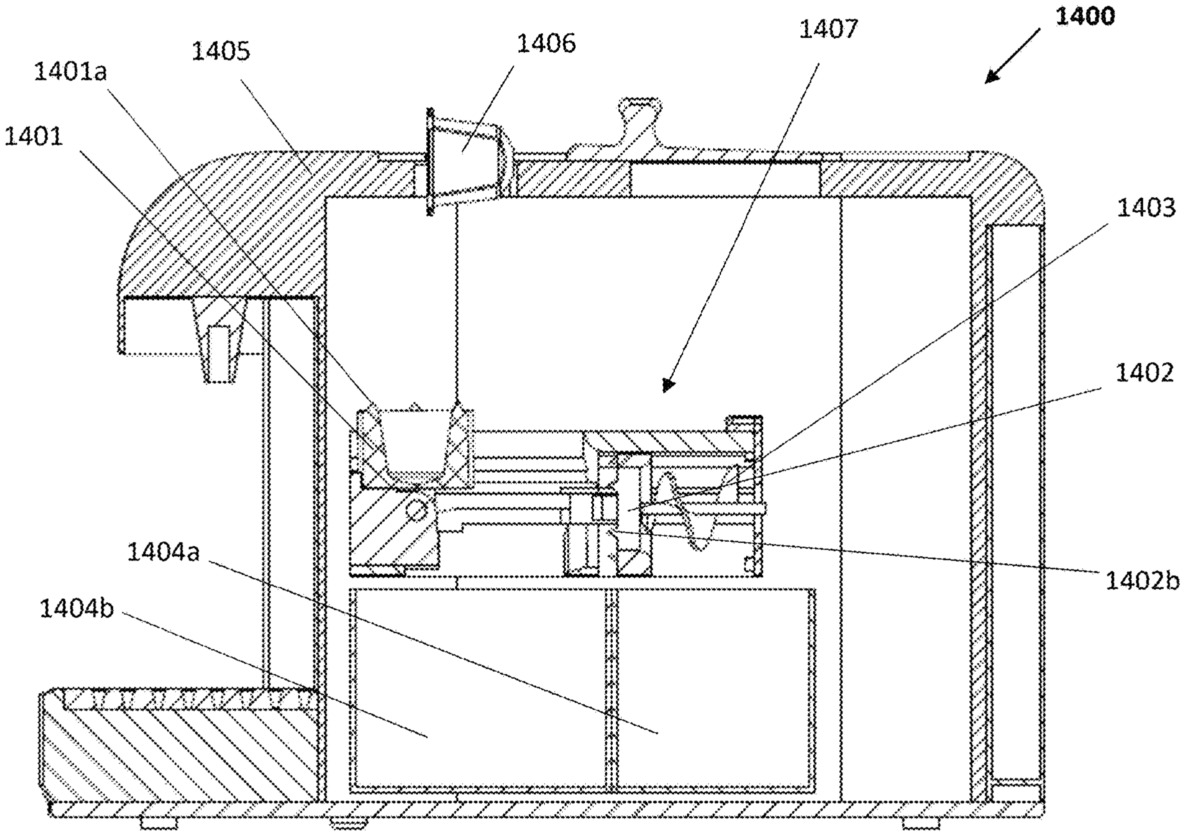
FIG. 14A is an image of a beverage preparation device, including an extraction device, according to one embodiment.
Figure 14B:
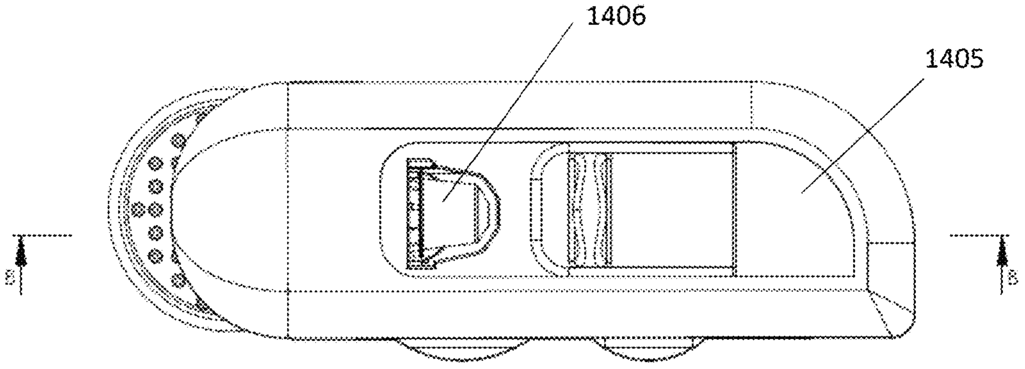
FIG. 14B is a top side plane view of the beverage preparation device as also shown in FIG. 14A.
Figure 15:
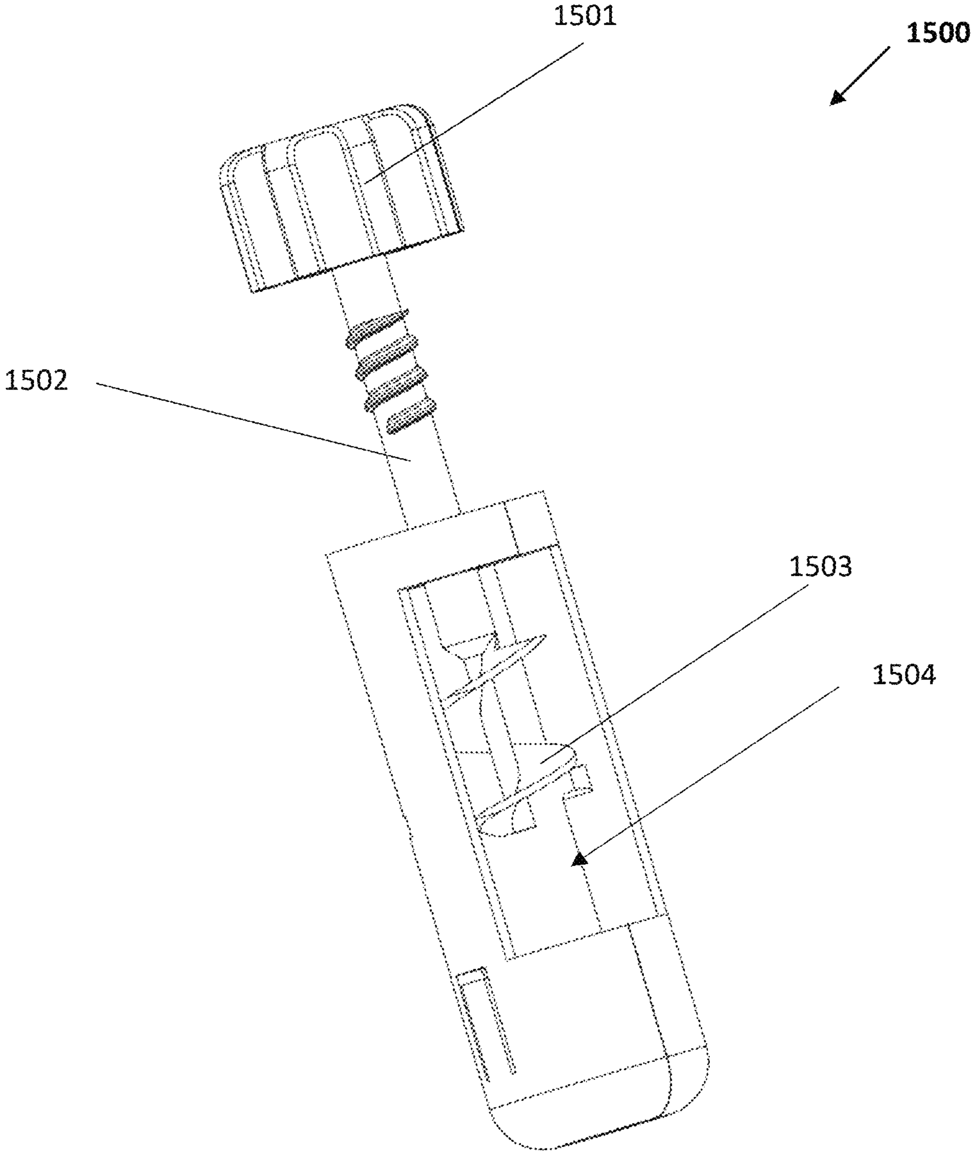
FIG. 15 is a side view of a manual extraction device, according to one embodiment.
Figure 16A:
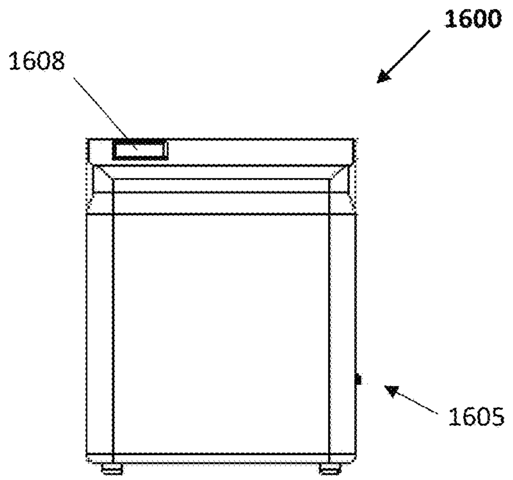
FIG. 16A is an image of an industrial-scale extraction device, including an extraction device, according to one embodiment.
Figure 16B:
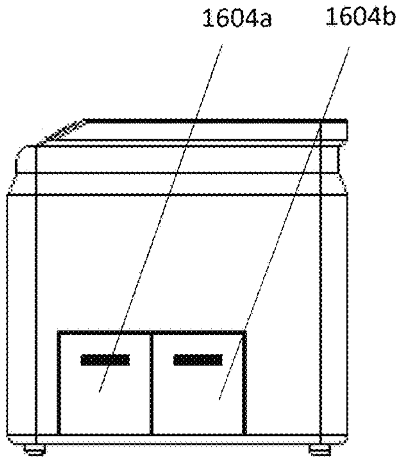
FIG. 16B is a side plane view of the industrial-scale extraction device as also shown in FIG. 16A.
Figure 16C:
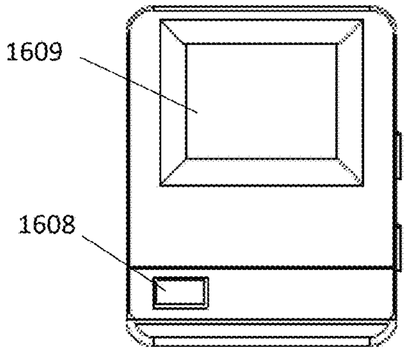
FIG. 16C is a top side plane view of the industrial-scale extraction device as also shown in FIG. 16A.
Figure 16D:
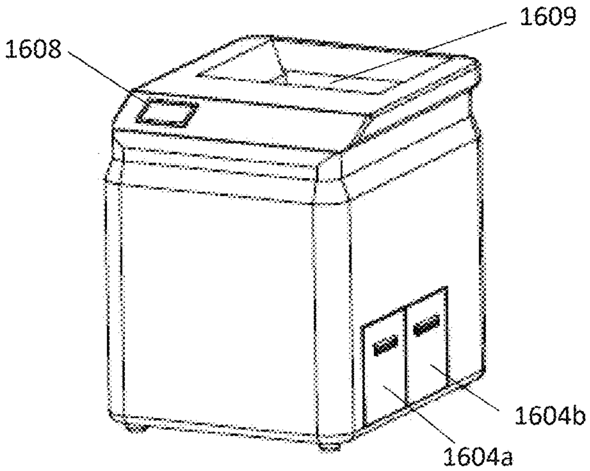
FIG. 16D is an elevated side perspective view of the industrial-scale extraction device as also shown in FIG. 16A.

Some embodiments of the present disclosure relate to a beverage preparation device. In some embodiments, the beverage preparation device comprises a housing; a plurality of tanks; a capsule storage mechanism; and any extraction device disclosed in the present application. In some embodiments, for example, the beverage preparation device is a coffee machine. For example, FIGS. 14A and 14B are images of a beverage preparation device 1400. With combined reference to FIGS. 14A and 14B, beverage preparation device 1400 includes retainer 1401, anchor 1402, screw 1403, containers 1404*a* and 1404*b*, housing 1405, and extraction device 1407. Anchor 1402 includes a locking mechanism 1402*b* as a means for coupling anchor 1402 to retainer 1401 through physical engagement with component 1401*a*. In some embodiments, container 1404*a* is configured to collect and store debris extracted from capsule 1406. In other embodiments, container 1404*b* is configured to collect and store capsule 1406 after being substantially cleaned of the debris with the extraction device 1407.

Manual Extraction Device

Some embodiments of the present disclosure relate to a manual extraction device. In some embodiments, the manual extraction device includes a plunger and a screw. In some embodiments, the plunger positioned at a proximal end of the manual extraction device and the screw is positioned at a distal end of the manual extraction device. In some embodiments, the manual extraction device further includes a slot configured to retain a capsule. In some embodiments, the manual extraction device further includes a handle. For example, FIG. is 15 is an image of a manual extraction device 1500, which includes handle 1501, plunger 1502, screw 1503, and a slot 1504 configured to retain a capsule.

Industrial-Scale Extraction Device

Some embodiments of the present disclosure relate to an industrial-scale extraction device, including an extraction device of the present disclosure. In some embodiments, the industrial-scale extraction device comprises a housing; a display element; one or more containers; and any screw disclosed in the present application. For example, FIGS. 16A, 16B, 16C, and 16D are images of an industrial-scale extraction device 1600 including a screw of the present disclosure, containers 1604*a* and 1604*b*, housing 1605, display element 1608, and feeder system 1609. In some embodiments, container 1604*a* is configured to collect and store debris extracted from capsules. In other embodiments, container 1604*b* is configured to collect and store capsules after being substantially cleaned of the debris with the industrial-scale extraction device 1600.

Figure 17:
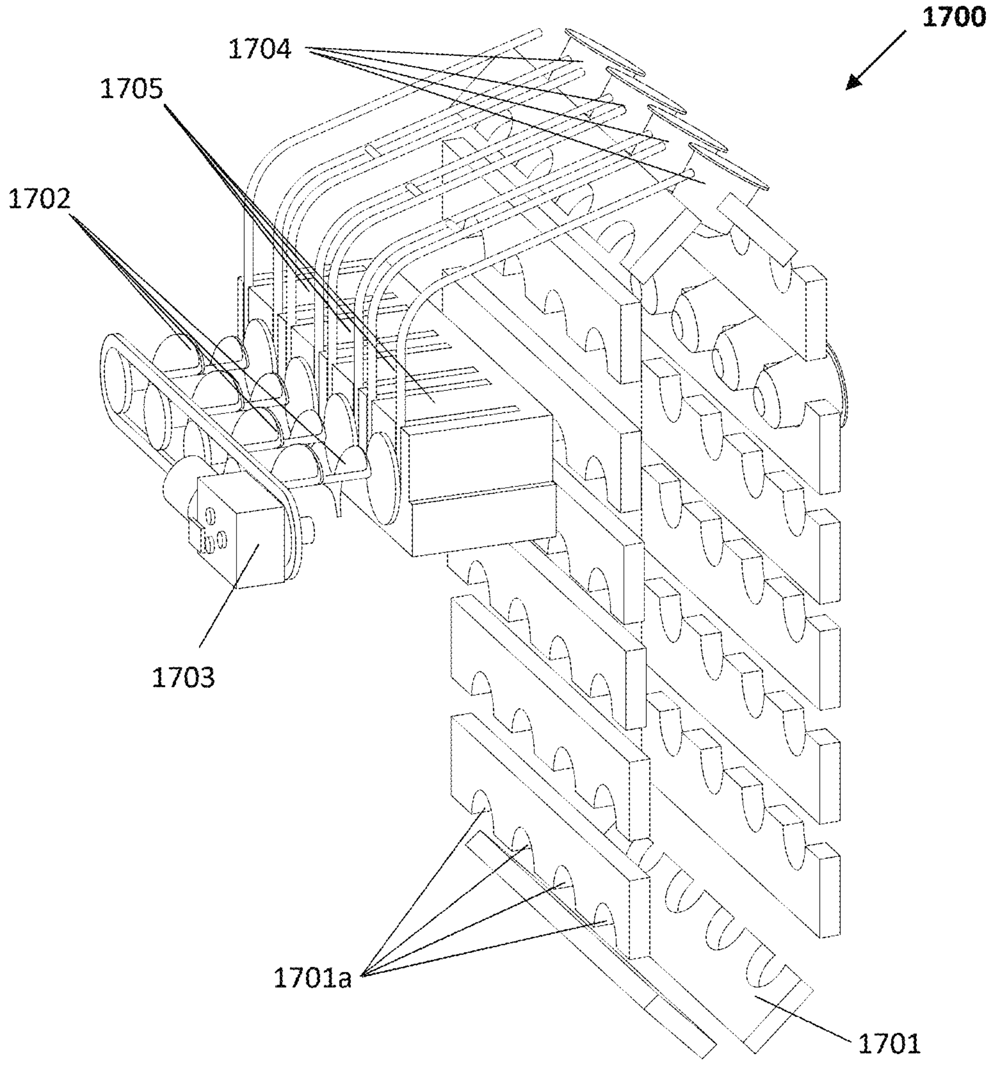
FIG. 17 is an image of an extraction conveyor assembly system, according to one embodiment.

In some embodiments, the industrial-scale extraction device further includes an extraction assembly system. In some embodiments, the extraction assembly system includes a conveyor assembly. In some embodiments, the conveyor assembly is configured to receive a plurality of capsules distributed along the conveyor assembly and carry a plurality the capsules towards a plurality of screws of the present disclosure. For example, FIG. 17 is an image of an extraction conveyor assembly system 1700, including conveyor assembly 1701, a plurality of screws 1702 of the present disclosure, a motor 1703, and a plurality of retainers 1705. In some embodiments, a plurality of capsules 1704 are distributed along the conveyor assembly 1701. In some embodiments, the conveyor assembly 1701 includes a plurality of orifices 1701*a* configured to latch the plurality the capsules 1704. In some embodiments, the conveyor assembly 1701 is configured to transport the plurality the capsules 1704 to the plurality of retainers 1705.

Figure 18:
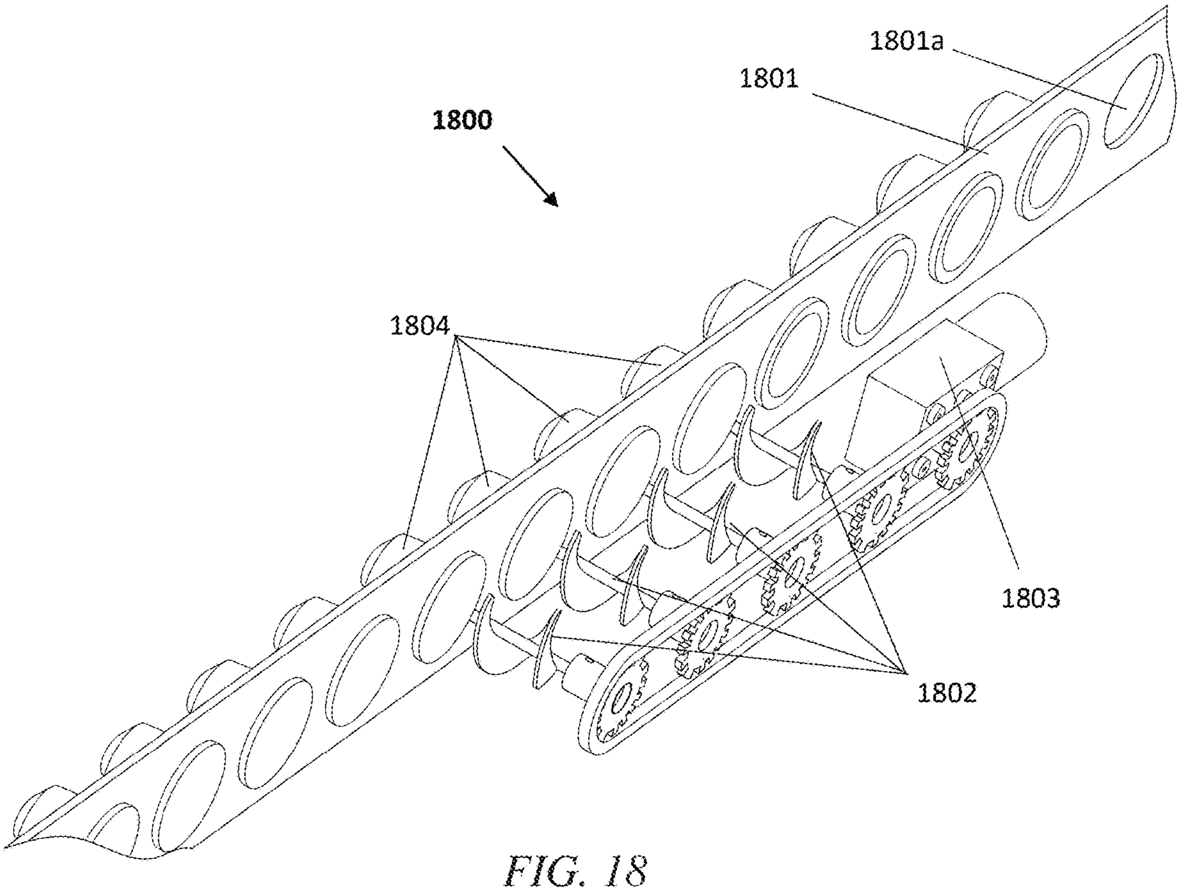
FIG. 18 is an image of an extraction convey belt system, according to one embodiment.

In some embodiments, the extraction assembly system includes a conveyor belt. In some embodiments, the conveyor belt includes a plurality of segments. In some embodiments, each segment is connected to an adjacent segment to form a continuous loop. In some embodiments, one or more segments of the conveyor belt is controlled by a controller such as a computer. In some embodiments, the controller controls an electric roller or motor that actuates the conveyor belt to move a plurality of capsules along the conveyor. In some embodiments, the conveyor belt is configured to receive a plurality of capsules distributed along the conveyor belt and carry the plurality of capsules towards a plurality of screws of the present disclosure. For example, FIG. 18 is an image of an extraction conveyor belt system 1800, including conveyor belt 1801, a plurality of screws 1802 of the present disclosure, and a motor 1803. In some embodiments, the conveyor belt 1801 includes a plurality of orifices 1801*a* configured to retain the plurality the capsules 1804. In some embodiments, a plurality of capsules 1804 are distributed along the conveyor belt 1801. In some embodiments, the conveyor belt 1801 is configured to transport carry the plurality of capsules 1804 towards a plurality of screws 1802 of the present disclosure.

Capsule Material

In some embodiments, the capsule is comprised of a material selected from a metal, a plastic, a rigid biological material, and a wood-based material. In some embodiments, the material is a metal. In some embodiments, the material is a plastic. In some embodiments, the material is a wood-based material. In some embodiments, the metal is aluminum. In some embodiments, the plastic is selected from a polystyrene and a polypropylene. In some embodiments, the plastic is polystyrene. In some embodiments, the plastic is polypropylene. In some embodiments, the material is biodegradable. In some embodiments, the material is at least partially biodegradable. In some embodiments, the rigid biological material is selected from a plant material, a mycelial material, and the wood-based materials is selected from cardboard and wood fiber. In some embodiments, the rigid biological material is a plant material. In some embodiments, the rigid biological material is a mycelial material. In some embodiments, the mycelial material is mushroom mycelia. In certain embodiments, the wood-based material is a cardboard. In some embodiments, the wood-based material is a wood fiber. In further embodiments, the wood-based material is lined with plastic. In some embodiments, the proximal end of the capsule comprises an external wing.

Methods

Some embodiments of the present disclosure relate to a method of reusing a beverage capsule. In some embodiments, the method of reusing a beverage capsule comprises brewing an ingredient in the capsule and recycling the capsule any extraction device disclosed in the present application.

Some embodiments of the present disclosure relate to a method of cleaning a recyclable capsule of debris. In some embodiments, the method of cleaning a recyclable capsule of debris comprises removing debris from the capsule and substantially cleaning the capsule of the debris with any extraction device disclosed in the present application. In some embodiments, the proximal end of the capsule comprises an external wing. In some embodiments, the method of cleaning a recyclable capsule further comprises rotating the screw within the capsule. In some embodiments, rotating the screw causes the wing and sides of the capsule to engage. In some embodiments, engagement of the capsule causes the wing and sides of the capsule to deform. In some embodiments, the capsule is engaged by applying pressure on the sides and wing of the capsule.

What is claimed is:

1. An extraction device for cleaning a capsule, comprising:

a screw comprising a shaft and at least one thread forming a helical spiral positioned at the distal portion of the shaft, wherein the helical spiral is defined by the outer edge of the thread, wherein the pitch of the helical spirals ranges from about 5 mm to about 50 mm, wherein the radius of the spiral increases from zero to a predetermined length, and wherein the shaft comprises a cavity extending through the length of shaft, wherein the shaft comprises an outlet positioned at the distal end of the shaft, wherein the screw substantially contours to the capsule, and the outlet is configured to eject a gaseous or liquid solution;

a feeder system;

a retainer; and a transport system;

wherein the transport system is configured to displace the retainer towards the screw;

wherein the transport system comprises an axle and a pin, configured to orient the retainer from a vertical orientation to a horizontal orientation, and an anchor configured to couple the capsule to the retainer.

2. The extraction device of claim 1, wherein the retainer, the axle, and the pin are further configured to apply pressure to the capsule.

3. The extraction device of claim 2 wherein the helical spirals are configured to have a plurality of gap slots within the helical spirals.

4. The extraction device of claim 2, wherein the length of the shaft ranges from about 30 mm to about 200 mm.

5. The extraction device of claim 1, wherein the helical spiral encompasses a turn of at least about 240°.

6. The extraction device of claim 5, wherein the helical spiral encompasses a turn of at least about 720°.

7. The extraction device of claim 6, wherein the helical spiral encompasses a turn of at least about 1,440°.

8. The extraction device of claim 5, wherein the helical spirals are configured to have a plurality of gap slots within the helical spirals.

9. The extraction device of claim 1, wherein the helical spirals are configured to have a plurality of gap slots within the helical spirals.

10. The extraction device of claim 1, wherein the length of the shaft ranges from about 30 mm to about 200 mm.

11. The extraction device of claim 1, wherein the pitch of the helical spirals ranges from about 5 mm to about 20 mm.

12. The extraction device of claim 1, wherein the pitch of the helical spirals ranges from about 5 mm to about 15 mm.

13. The extraction device of claim 1, wherein the pitch of the helical spirals ranges from about 10 mm to about 20 mm.

14. The extraction device of claim 1, wherein the length of the shaft ranges from about 50 mm to about 200 mm.

15. The extraction device of claim 1, wherein the length of the shaft ranges from about 100 mm to about 250 mm.

* * * * *